United States Patent [19]
Cheng

[11] Patent Number: 5,388,414
[45] Date of Patent: Feb. 14, 1995

[54] HIGH PERFORMANCE IN-SITU FREEZING-MELTING PROCESS

[76] Inventor: Chen-Yen Cheng, 9605 La Playa NE., Albuquerque, N. Mex. 87111

[21] Appl. No.: 708,507

[22] Filed: May 31, 1991

Related U.S. Application Data

[63] Continuation-in-part of Ser. No. 516,460, Apr. 30, 1990, Pat. No. 5,059,228.

[51] Int. Cl.$^6$ .............................................. F25J 5/00
[52] U.S. Cl. .................................. 62/12; 62/123; 62/532
[58] Field of Search ............................ 62/12, 532, 123

[56] References Cited

U.S. PATENT DOCUMENTS

| | | | |
|---|---|---|---|
| 4,236,382 | 12/1980 | Cheng et al. | 62/537 |
| 4,505,728 | 3/1985 | Cheng et al. | 62/542 |
| 4,578,093 | 3/1986 | Cheng et al. | 62/532 |
| 4,650,507 | 3/1987 | Cheng et al. | 62/12 |
| 4,654,064 | 3/1987 | Cheng et al. | 62/532 |
| 4,810,274 | 3/1989 | Cheng et al. | 62/12 |

Primary Examiner—Ronald C. Capossela

[57] ABSTRACT

The processes and apparatuses of the present invention are to be used in separating a mass of purified volatile solvent from a dilute solution of the solvent. They are used in purification of chemicals, water pollution prevention and water purification. The process comprises: (a) an in-situ formation of a smooth layer of solvent solid on a freezing surface while agitating the solid-liquid interface, (b) vaporization of an auxiliary medium to generate a first vapor, (c) in-situ washing of the surface of the smooth solvent solid and (d) in-situ melting of purified solvent solid by condensing a mass of super-triple point solvent vapor. Several types of auxiliary mediums to be used, methods of transforming the first vapor into a mass of liquid and methods of upgrading heat and regenerating the auxiliary mediums have been introduced.

58 Claims, 10 Drawing Sheets

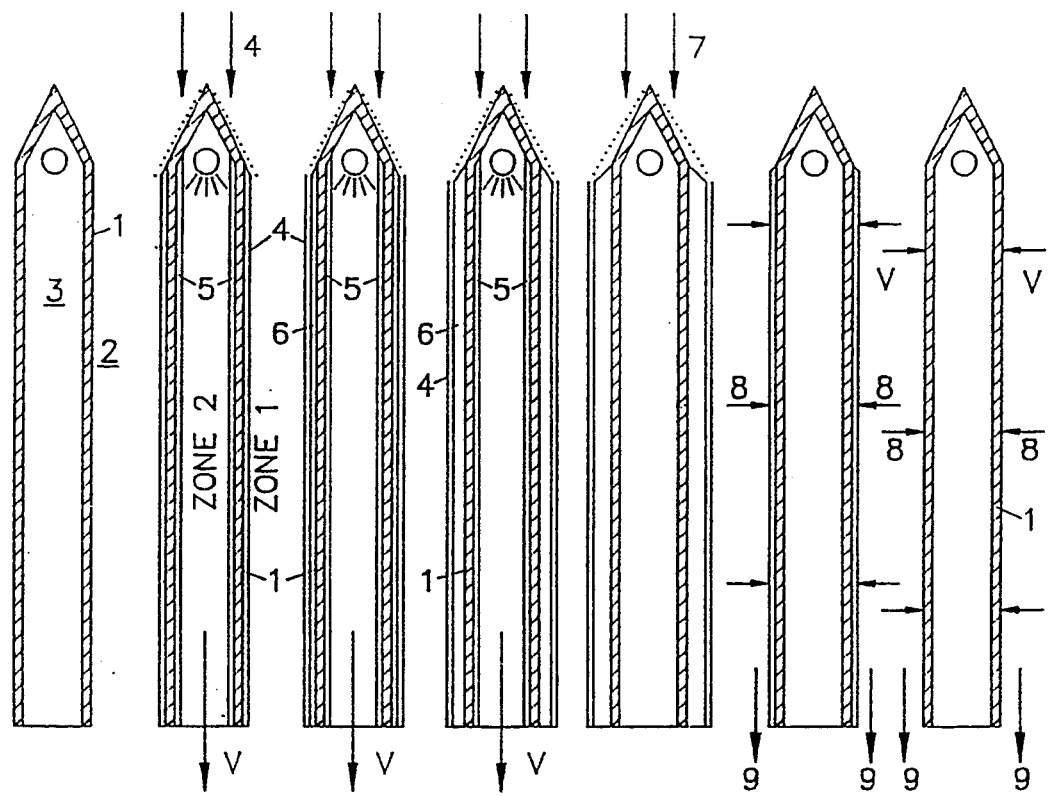
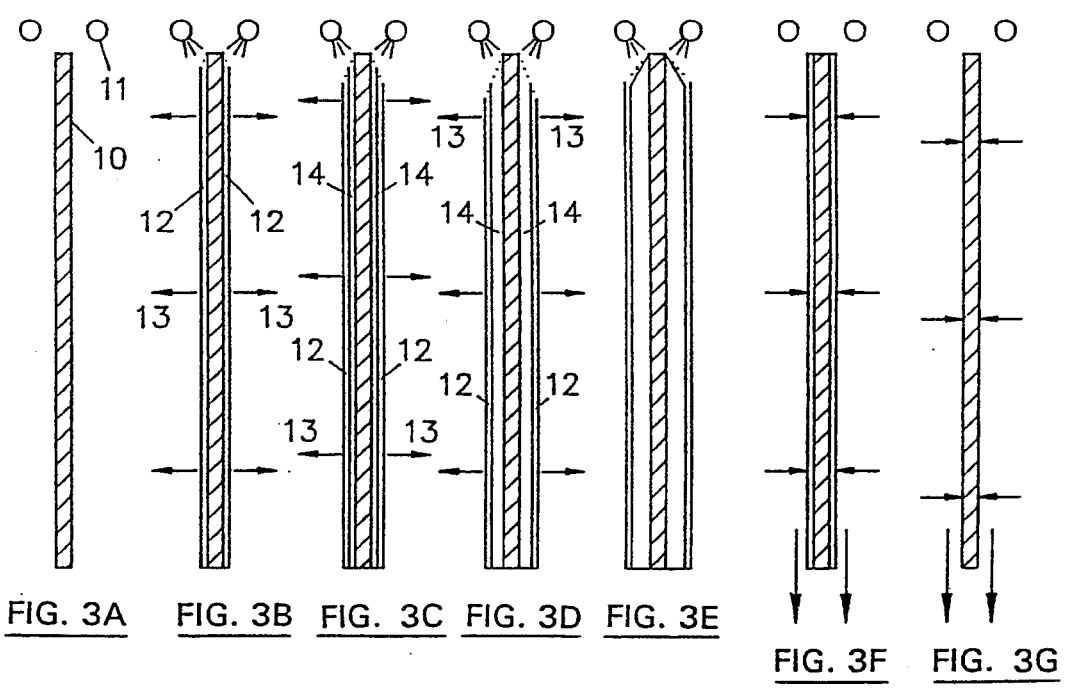

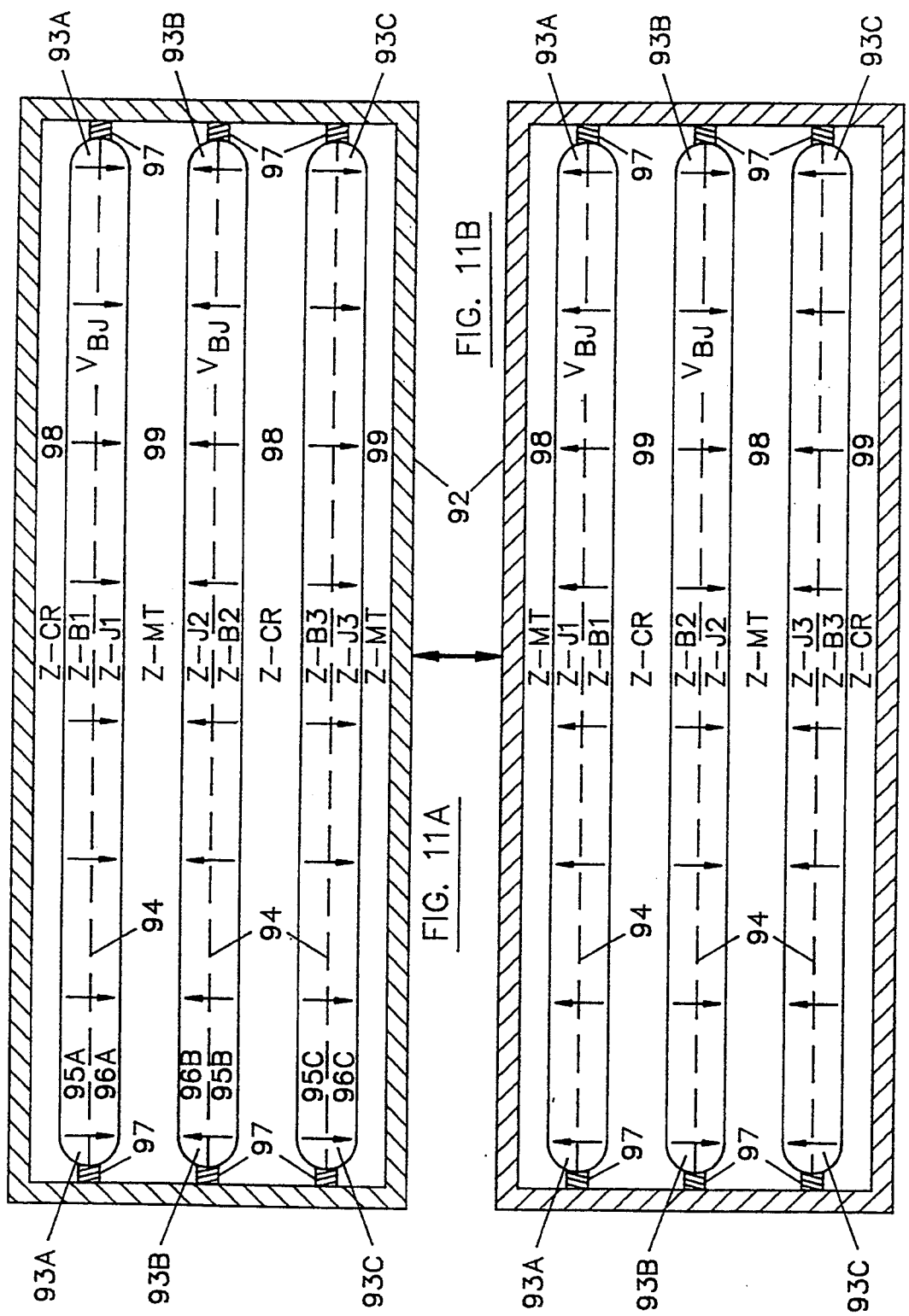

HIGH PERFORMANCE IN-SITU FREEZING-MELTING PROCESS

RELATED APPLICATION

This application is a continuation-in-part application of Ser. No. 07/516,460, filed Apr. 30, 1990, now U.S. Pat. No. 5,059,228.

BACKGROUND OF THE INVENTION

FIELD OF INVENTION

The processes and apparatuses of the present invention are to be used in separating a mass of purified volatile solvent from a dilute solution of the solvent. Some typical applications are as follows:

(1) Purification of Chemicals

The purity of a chemical often has a profound effect on the quality of end products manufactured from it. The functional property of polymers, the pharmacological effect of drugs, the clarity and transmissibility of optical fibers, the sensibility of analytical assays and the reliability of semiconductor chips all depend on the purity of the chemicals used. The process can be used for separating purified major components from mixtures containing low levels of impurities. Therefore, the process can be used for producing specialty and fine chemicals and high purity bulk chemicals.

(2) Water Pollution Prevention

Many types of polluted water streams are dilute aqueous solutions which may contain dissolved and/or suspended organic substances. The present process can be used to recover purified water for reuse and produce a mass of concentrated waste water to facilitate disposed and/or value recovery. Examples are low level nuclear waste waters, hospital waste waters, cooling tower blow-down streams, contaminated ground water and leachates, oil/water mixtures and organic chemicals wastewater.

(3) Production of Good Quality Water

Water supplies in many parts of the world are contaminated. The present process can be used to produce high quality water from these dilute contaminated water streams. Good quality drinking water can be produced by the present process.

BRIEF DESCRIPTION OF THE INVENTION

The High Performance In-Situ Freezing-Melting Process of the present invention represents a major breakthrough in the freeze concentration technology. It has introduced many innovations to enhance the rates of conducting the in-situ freezing operations and in-situ melting operations; it has introduced new ways of providing heat interactions during the freezing and melting operations and accomplishing heat upgrading; it has introduced new apparatuses for conducting the freeze concentration process. Because of these innovations, (a) the product quality is improved,
(b) the operations are made reliable and are greatly simplified,
(c) the operation cost and equipment cost are greatly reduced.

The present process is to be used to produce purified solvents from dilute aqueous and non-aqueous solutions. The process comprises the following three primary processing steps:

Step 1: In-situ Formation of a Smooth Layer of Solvent Solid on a Solid Surface by Agitating the Interface.

A dilute solution is frozen on a solid surface to form a layer of solvent solid by removing heat from the solution. The solution near the solvent solid-solution interface is well agitated to enhance transport of solute away from the interface and maintain the stability of the freezing front. The surface of the solvent solid formed is either smooth or nearly smooth. The heat removal is accomplished by use of an auxiliary heat interaction medium that is subjected to a phase change such as vaporization-condensation, desorption-absorption and melting-solidification.

Step 2: In-Situ Washing of the Surface of the Smooth Solvent Solid.

After a freezing step of forming a layer of smooth solvent solid, a thin layer of mother liquor is retained on the solid surface. A small amount of pure solvent is applied to the surface to wash the mother liquor from the surface. This step may be incorporated with the third step of in-situ melting of the solid. The liquid formed in the initial period of the melting period may serve as the wash liquid.

Step 3: In-Situ Melting of the Purified Solvent Solid.

A mass of a super-triple point solvent vapor, a solvent vapor whose pressure is somewhat higher than the triple point pressure, is generated and brought into contact with the purified solvent solid to thereby simultaneously condense the vapor and melt the solid.

An auxiliary heat interaction medium, also denoted as an auxiliary medium, enters heat interaction to remove heat of freezing in Step 1; a super-triple solvent is generated and is brought in direct contact with purified solvent solid to melt the solid in Step 3. Some way of heat upgrading is used so that the heat released in the freezing step be utilized in the melting step.

When an aqueous solution of a proper composition is used as the auxiliary medium, a sub-triple point vapor, whose pressure is lower than the triple point pressure of the medium is generated. The sub-triple point vapor may be transformed into a liquid mass by a two step process involving desublimation and desublimate melting operations by interacting with a refrigeration loop. The sub-triple vapor may also be subjected to a temperature lifting absorption operation so that the heat released in the absorption operation is utilized to generate the super-triple point vapor, also referred to as the second vapor, needed in Step 3. A low vapor pressure auxiliary medium, such as ethanol, methanol, acetone and propanol, may be used to remove the heat of freezing and generate the super-triple point vapor by interacting with a refrigeration loop. A high vapor pressure medium, such as a conventional refrigerant used in a commercial refrigeration machine, may also be used as the auxiliary medium. In this case, the vapor generated can be compressed directly. A working medium that freezes under a first pressure and a first temperature and melts under a second pressure and a second temperature may be used to upgrade the heat.

A unique heat upgrading heat transfer panel has been introduced to conduct the primary steps. A heat upgrading panel has two heat conductive walls providing an inner surface and an outer surface. The outer surface has a first region and a second region and these two regions alternately serve as a cooling surface and a heating surface to provide the cooling and heating needed for Step 1 and Step 3 described.

BRIEF DESCRIPTION OF PRIOR ART

The High Performance In-Situ Freezing-Melting Process of the present invention incorporates some features of the Programmed In-Situ Indirect Freezing Process and the Vacuum Freezing Process. It further incorporates innovations for enhancing rates of in-situ freezing and melting, for enhancing interactions with an auxiliary interaction medium, for effectively upgrading heat, for simplifying operation, for simplifying construction of the apparatuses used. Therefore, a review of the Programmed In-Situ Indirect Freezing and the Vacuum Freezing Processes is presented. The High Performance In-Situ Freezing-Melting Process is based on formation of a smooth layer of solvent solid, which in turn depends on maintaining a stable solid-liquid interface during the freezing step. A review of the Interface Stability Theory based on "Constitutional Supercooling" is also presented.

B. Chalmer and J. W. Rutter introduced the "Constitutional Supercooling Theory" for predicting solid-liquid interface stability in Canadian Journal of Physics, Volume 31, p. 15, 1953. According to the theory, as a solution is frozen by an indirect contact cooling, a solute-rich layer is formed in front of the growing interface. In this layer, the solute concentration is a maximum at the interface and decreases with increasing distance from the interface. Now, with the aid of the phase diagram, one can plot the equilibrium liquidus temperature of the liquid as a function of distance from the interface. The equilibrium liquidus temperature increases with distance from the interface because the lower the solute content, the higher the liquidus temperature. To this diagram, one can superimpose the actual temperature profile. When every point in front of the interface is at a temperature above the liquidus temperature, the growing solid-liquid interface is stable. When liquid immediately in front of the interface is at an actual temperature that is below its equilibrium liquidus temperature, the liquid is supercooled. Chalmers and coworkers termed this "constitutional supercooling"; the word constitutional indicates that the supercooling arises from a change in composition, not temperature. In other words, a constitutional supercooling is a supercooling induced by concentration distribution. When a liquid film formed on a solid surface is subjected to a solid-liquid-vapor (S/L/V) multiple phase transformation operation, the actual temperature gradient ahead of the crystal is negative, with the heat of crystallization transferred through the solution and removed by vaporization at the liquid-vapor interface. Since the liquidus temperature profile is always positive, there is some degree of constitutional supercooling established in the multiple phase transformation operation. There are, however, some stabilizing factors that retard the onset of unstable growth that leads to development of irregular growth. The stability factors are related to nucleation of protuberance, which, in turn, is related to the anisotropy of surface energy. In any case, when the degree of constitutional supercooling exceeds a certain limit the interface becomes nonsmooth such as cellular or dendritic. By a proper agitation of the interface liquid to enhance the transport of solute away from the interface, and maintaining a proper freezing rate, the interface stability can be maintained and a smooth solvent solid can be formed.

The Programmed In-Situ Indirect Freezing Process, also referred to as the Programmed Freezing Process, was introduced by Chen-Yen Cheng and Sing-Wang Cheng in the early 1970's and studied by Chen-Yen Cheng and his co-workers in University of Denver and University of New Mexico. Some laboratory testing has been done on aqueous and non-aqueous solutions. In processing a dilute solution, the process comprises a first step of feeding a mass of feed liquid into a small conduit made of a heat conductive wall, a second step of forming a smooth layer of solvent solid on the conduit wall, a third step of washing the interface and a fourth step of in-situ melting the solvent solid. In the second step, the liquid is agitated by an oscillatory pumping operation and heat is removed through the wall. In the fourth step, the solid is melted by transferring heat through the wall. The process has not been developed into a commercial process. Several difficulties have been encountered in conducting the cyclic operations repeatedly. These are:

(1) The rate of in-situ melting is a slow process, because heat has to transfer through a layer of melt before it reaches the melt interface;
(2) Any residual solid from Step 4 in a cycle interferes the operation of the next cycle;
(3) A proper way of controlling degree of supercooling has not been accomplished;
(4) A proper way of upgrading heat has not been incorporated.

It is noted that the innovations incorporated in the process of the present invention have overcome all the difficulties of the Programmed Freezing Process.

Referring to the processing of an aqueous solution by any vacuum freezing process, the aqueous solution is introduced into a chamber which is maintained at a pressure that is somewhat lower than the vapor pressure of the solution at the freezing temperature of the solution to thereby simultaneously flash vaporize water and form ice crystals. This operation is referred to as S/L/V multiple phase transformation in a vacuum freezing process. As the result of this operation, a low pressure water vapor, referred to as a first vapor, and an ice-mother liquor slurry, referred to as a first condensed mass, are formed. In the case of sea water desalination, this pressure is around 3.5 torr. The low pressure water vapor formed has to be removed and transformed into a condensed state; the ice crystals have to be separated from the mother liquor; the resulting purified ice has to be melted to yield fresh water. Furthermore, the heat released in transforming the vapor into a condensed state has to be utilized in supplying the heat needed in melting the ice. The processes to be described utilize different ways of vapor removal and different ways of accomplishing the heat reuse.

Several vacuum freezing processes have been introduced by workers in the desalination field. These processes are (1) Vacuum Freezing Vapor Compression (VFVC) Process, developed by Colt Industries, and described in the Office of Saline Water, Research and Development Report No. 295, (2) Vacuum Freezing Vapor Absorption (VFVA) Process, developed by Carrier Corporation, and described in the Office of Saline Water, Research and Development Report No. 113, (3) Vacuum Freezing Ejector Absorption (VFEA) Process, developed by Colt Industries, and described in the Office of Saline Water, Research and Development Report No. 744, (4) Vacuum Freezing Solid Condensation (VFSC) Process developed in the Catholic University of America, and described in the Office of Saline Water, Research and Development Report No. 511, (5)

Absorption Freezing Vapor Compression (AFVC) Process, introduced by Concentration Specialists, Inc., and described in the report submitted to the Office of Saline Water, (6) Vacuum Freezing High Pressure Ice Melting (VFPIM), introduced by Chen-Yen Cheng and Sing-Wang Cheng, and described in U.S. Pat. No. 4,236,382 and (7) Vacuum Freezing Multiple Phase Transformation Process, also introduced by Chen-Yen Cheng and Sing-Wang Cheng and described in U.S. Pat. No. 4,505,728.

BRIEF DESCRIPTION OF THE DRAWINGS

A process of the present invention comprises three primary processing steps, heat interaction with an auxiliary heat interaction medium, heat upgrading and medium regeneration steps.

Referring to processing of an aqueous solution, a dilute feed solution is subjected to the three primary processing steps in a primary processing zone (Zone 1). The mass in the primary zone is referred to as the primary substance; the liquid in the primary zone is referred to as the primary liquid; the solid in the primary zone is referred to as the primary solid. These steps are: (a) agitated in-situ formation of a smooth layer of ice on a solid surface, (b) in-situ washing of the surface of the smooth layer of ice, and (c) in-situ melting of the purified smooth ice layer. A unique feature of the process is that while Step 1 is conducted with either a direct contact or an indirect contact heat transfer, Step 3 is always conducted by bringing a super-triple water vapor in contact with the smooth ice layer. In most cases, an auxiliary heat interaction medium is subjected to a phase change in an auxiliary zone (Zone 2) to form a first vapor and thereby remove the heat of freezing released in Zone 1 during Step 1.

The heat interaction between the primary substance and the auxiliary medium may either be direct or indirect. When the interaction is direct, the auxiliary medium is a part of the water in the feed. When the interaction is indirect, the auxiliary medium may be an aqueous solution having a proper freezing temperature range, a low vapor pressure medium such as ethanol, propanol, acetone and methanol, or a high vapor pressure medium such as a conventional refrigerant used in a commercial refrigeration machine. Depending on the auxiliary medium used, a proper way of upgrading heat is used to upgrade the heat and regenerate the medium. The upgraded heat is utilized in generating a mass of super-triple point vapor whose pressure is higher than the triple point pressure of the medium. This vapor is also referred to as a second vapor. As has been stated, the super-triple point vapor is brought in contact with the purified smooth ice layer to thereby simultaneously melt the ice and condense the vapor. The processing steps used in processing a dilute non-aqueous solution are similar to those described.

Processing systems of the present inventions can be classified into several classes depending on whether the heat interaction is direct or indirect, the auxiliary heat interaction medium used is the solvent itself, a solution of a low volatility solute in the solvent, a low vapor pressure medium, or a high vapor pressure medium, and methods of upgrading heat and regenerating the mediums.

FIGS. 1 (a–e) illustrates the "Constitutional Supercooling Theory" of predicting the interfacial stability that was introduced by B. Chalmer and J. W. Rutter in 1953.

FIGS. 2 (a–g) illustrates the progress of the three primary steps, where the interaction between the primary zone and the auxiliary zone is indirect. It shows that a smooth layer of ice is grown on the surface of a wall from a flowing film of the primary fluid when heat is removed through the wall. The smooth ice layer is then washed in-situ (Step 2) and then melted by bringing a super-triple point vapor in contact with the purified ice layer (Step 3). FIGS. 3 (a–g) illustrates similar operation by which a smooth ice layer is formed on a solid surface from a flowing film of the primary fluid when the fluid is subjected to a vacuum freezing operation. A portion of the water is flash vaporized under a sub-triple point pressure to remove the latent heat released in the freezing operation.

Figure 4:
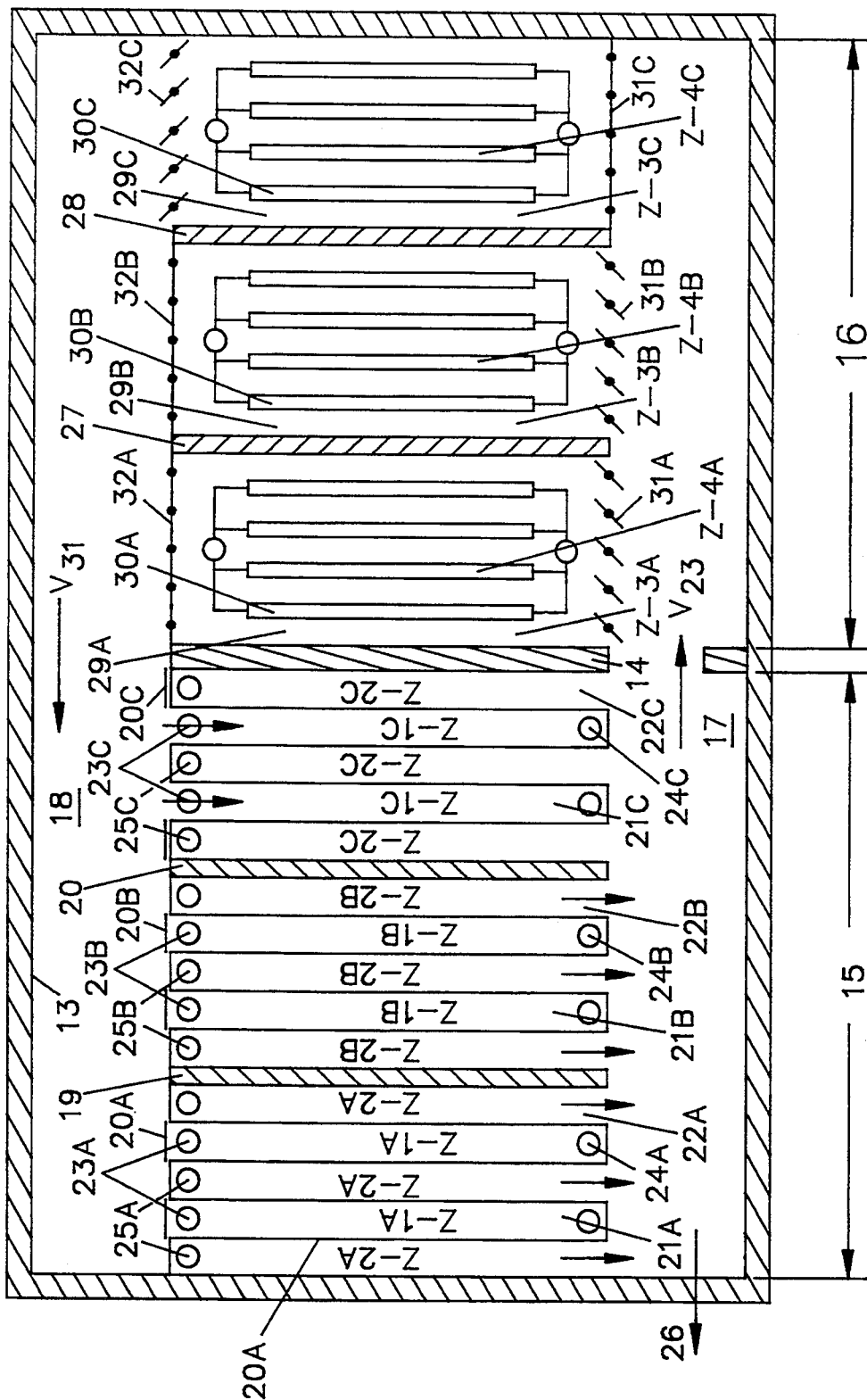

FIG. 4 illustrates a Class 1 system in which a solution of a non-volatile solute having the freezing point properly adjusted, denoted either as an FPA medium or simply as a B-solution, is used as the auxiliary medium. The first vapor generated is a sub-triple point vapor, which is liquified by a desublimation and a desublimate melting operation utilizing a refrigeration loop. A super-triple point vapor is generated by using the refrigeration loop. Due to the vaporization of water from the B-solution, the solution becomes concentrated. Water is added to the concentrated B-solution and is then recycled.

Figure 5:
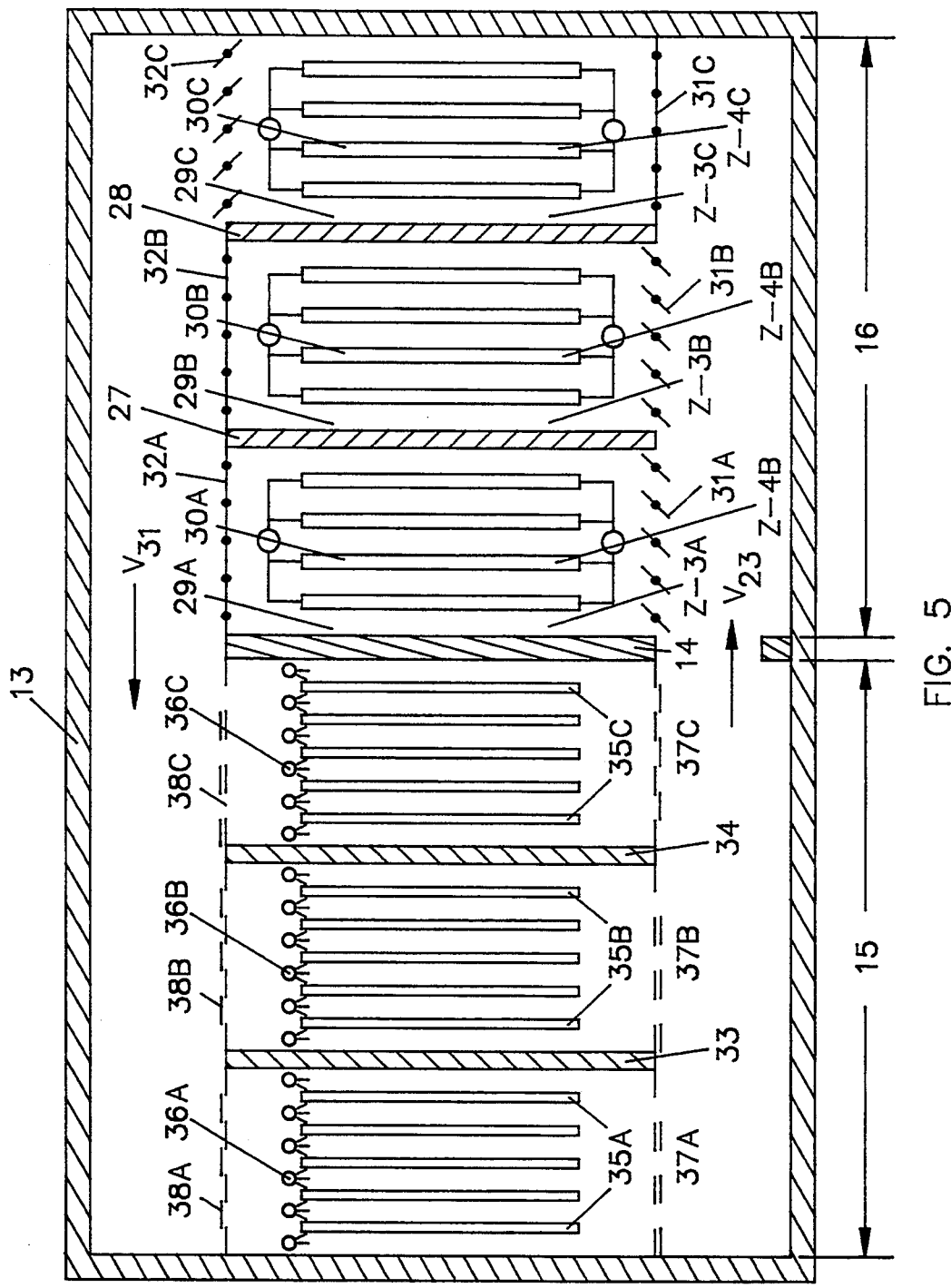

FIG. 5 illustrates a Class 2 system, in which an aqueous feed solution is flash vaporized to form a first vapor directly. Other operations are similar to those of the Class 1 system described.

Figure 6:
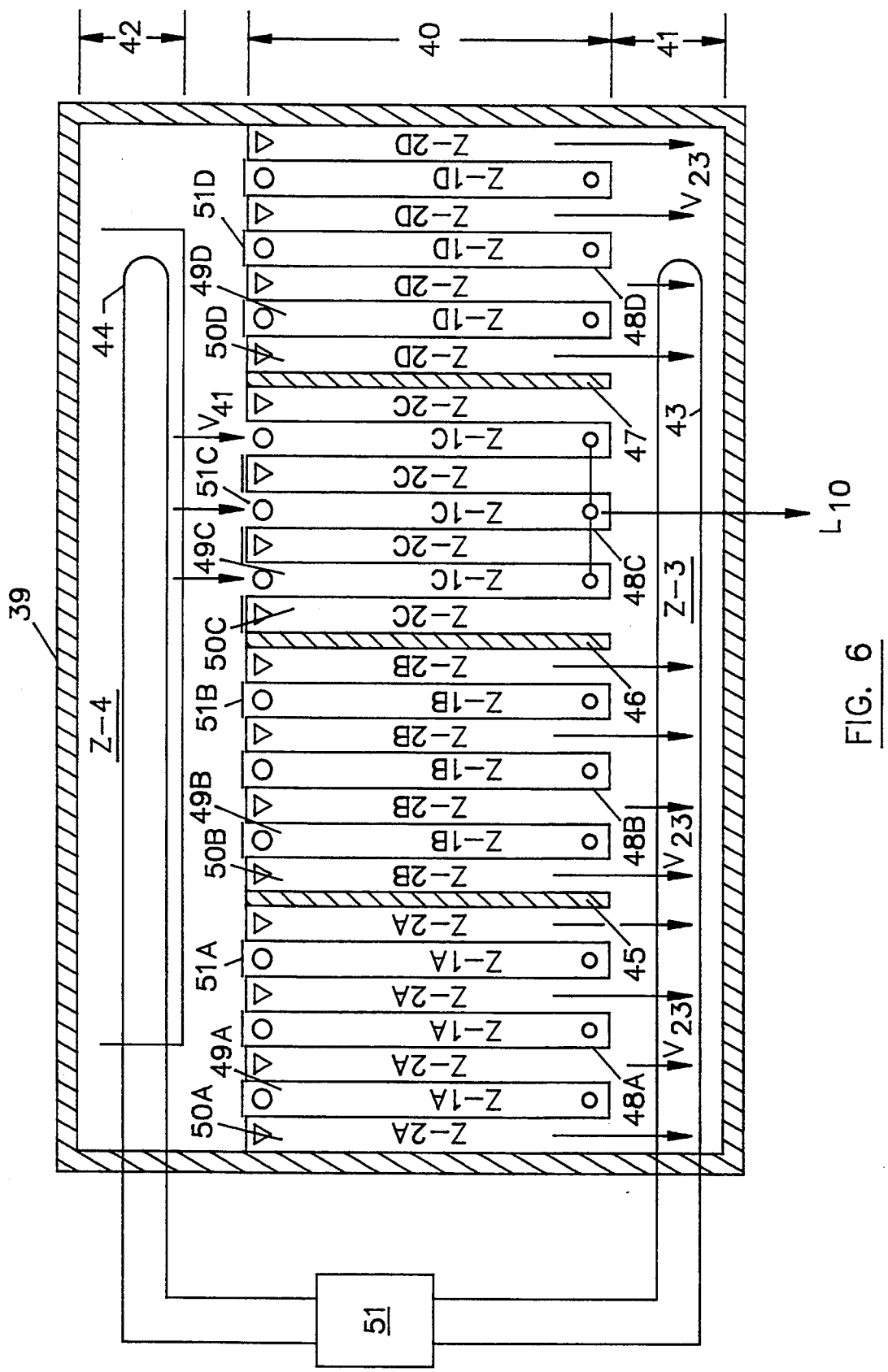

FIG. 6 illustrates a Class 3 system in which a low vapor pressure substance is used as the auxiliary medium. The medium used may be a pure substance or a mixture of substances. In treating an aqueous solution, some common substances to use are ethanol, methanol, propanol and acetone and aqueous solutions containing volatile solutes such as a water-ethanol mixture. In treating a non-aqueous solution, one may use pure volatile substances or solutions containing the solvent and one or more volatile solutions. It is noted that by adding one or more volatile solutes to the solvent, the first vapor can be transformed into a liquid mass by a simple condensation operation. The first vapor is subjected to a simple condensation and the second vapor is generated by using a refrigeration loop.

Figure 7:
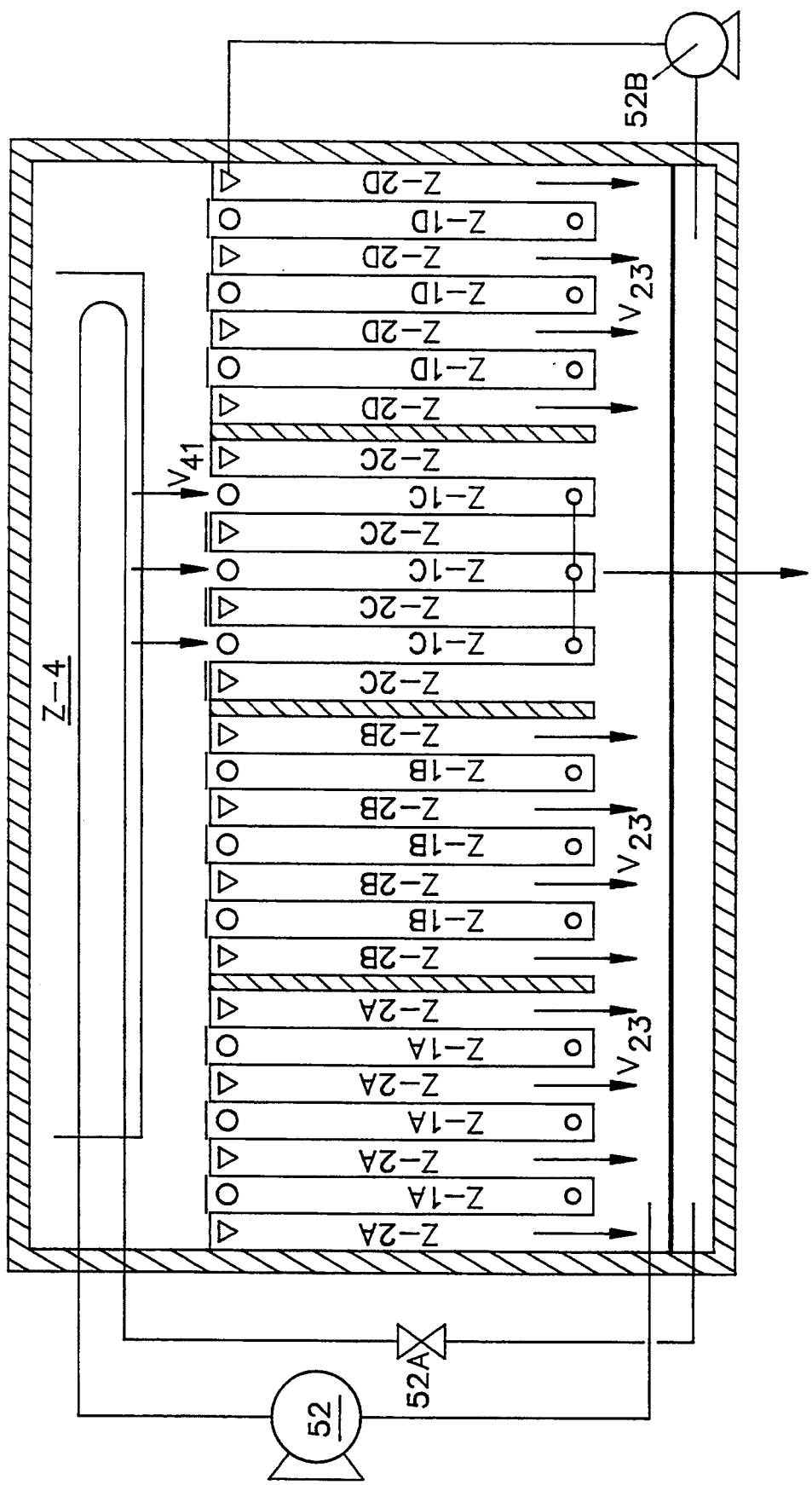

FIG. 7 illustrates a Class 4 system in which a high vapor pressure substance, such as a commercial refrigerant, is used as the auxiliary medium. In this system, the first vapor is directly compressed and the compressed refrigerant vapor is condensed to generate the second vapor used in Step 3.

Figure 8:
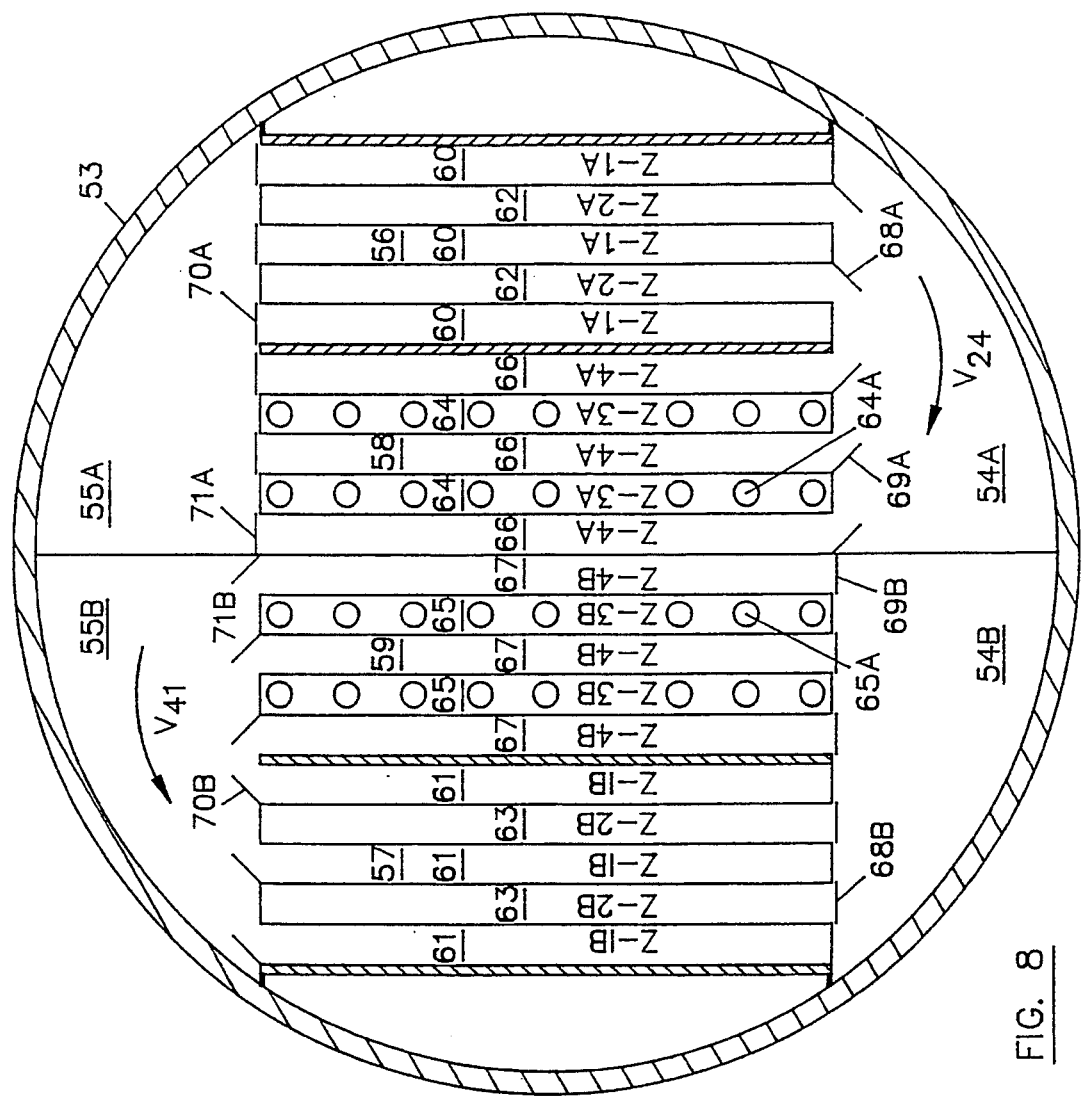

FIG. 8 illustrates a Class 5 system in which an aqueous solution containing a non-volatile solute is used as the auxiliary medium and a solid-liquid type heat upgrading medium is used to liquefy the first vapor and generate the second vapor.

Figure 9:
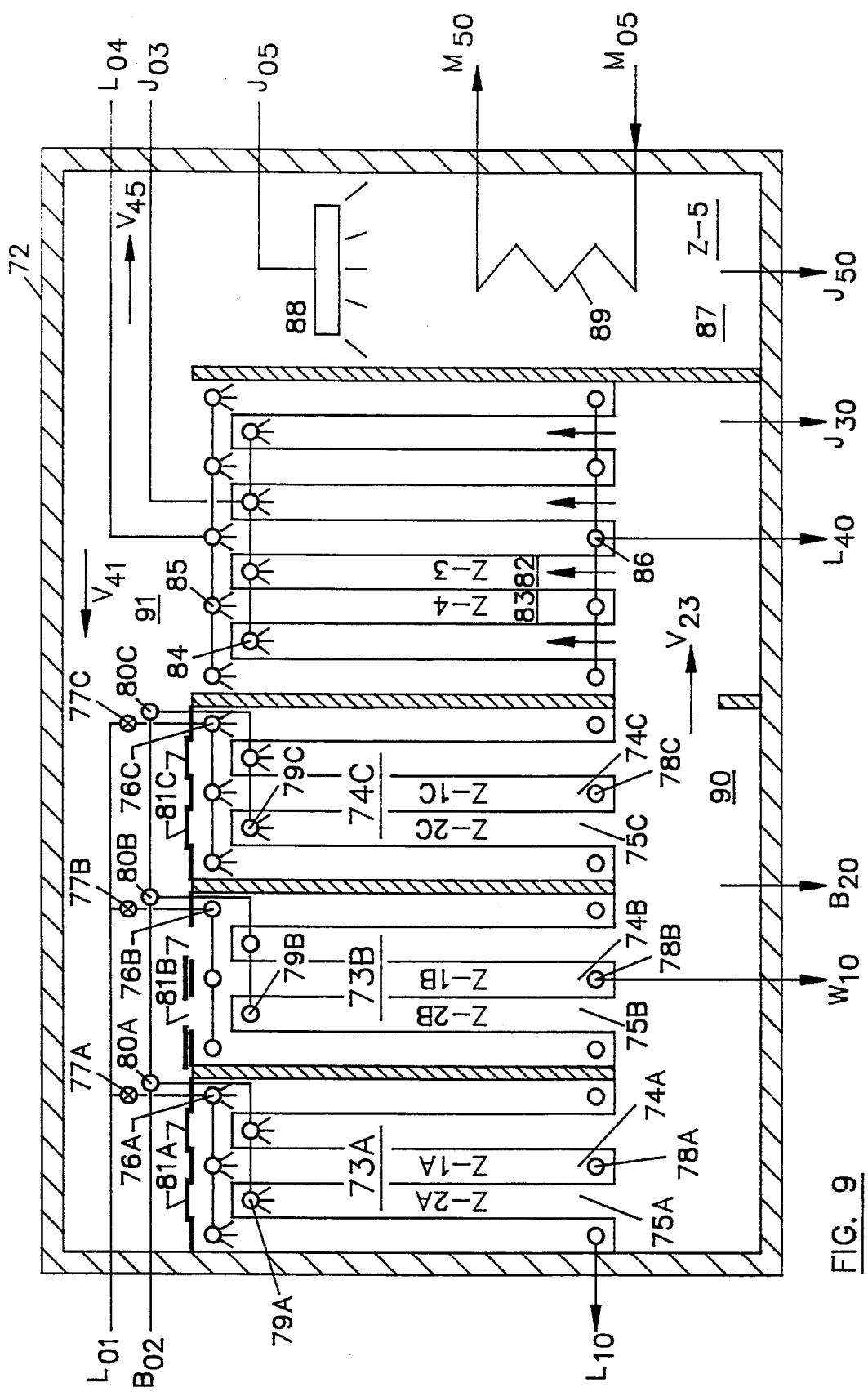

FIG. 9 illustrates a Class 6 system in which an aqueous solution containing a low volatility solute is used as the auxiliary medium, and the first vapor is subjected to a temperature lifting absorption operation to thereby generate the second vapor needed in the Step 3 operation.

FIGS. 10A, 10B, and FIGS. 11A, 11B respectively illustrate a Class 6A system and a Class 6B system. The operations in these two systems are similar to those of the Class 6 system. Special heat upgrading heat transfer panels, referred to as HUHT panels, are used in these two systems. A heat upgrading heat transfer panel comprises two metal sheets forming an enclosure. The outer surface is divided into two regions. The two regions are alternately used as a cooling zone for conducting Step 1 and as a heating zone for conducting Step 3. The two types differ in how the two regions are provided.

PREFERRED EMBODIMENTS OF THE INVENTION

The High Performance In-Situ Freezing-Melting Process of the present invention represents a major breakthrough in the freeze concentration technology. It has introduced many innovations to enhance the rates of conducting the in-situ freezing operations and in-situ melting operations; it has introduced new ways of providing heat interactions during the freezing and melting operations and accomplishing heat upgrading; it has introduced new apparatuses for conducting the freeze concentration process.

Table 1 summarizes processing systems of the present invention. Referring to processing of a dilute aqueous solution, the feed mixture is processed in a primary processing zone and is subjected to the following three primary processing steps:

Step 1: The feed solution is subjected to a freezing operation while the liquid, referred to as primary liquid, near the solid/liquid interface is agitated to thereby form a smooth or nearly smooth layer of ice on a solid surface;

Step 2: The interface of the solid-liquid interface is washed to remove mother liquor from the surface of the ice layer;

Step 3: A stream of super-triple point vapor whose pressure is higher than the triple point pressure of water is brought in contact with the purified ice layer to simultaneously condense the vapor and melt the ice layer successively from the outer surface toward the solid surface.

The liquid and solid in the primary processing zone are collectively referred to as the primary substance; the liquid in the zone is referred to as the primary liquid; the solid in the zone is referred to as the primary solid.

TABLE 1

Summary of the Processing Steps of the High Performance In-Situ Freezing-Melting Processes

| Primary Processing Steps | Heat Interaction | Heat Upgrading and Medium Regeneration |
|---|---|---|
| Step 1 | Indirect Contact | |
| Agitated In-Situ Freezing of a Smooth Layer of Ice on a Supporting Solid Surface | (a) Generation of a Sub-Triple Point Medium Vapor | (a) Two Stage Liquefaction with a refrigeration loop |
| | (b) Generation of a Low Vapor Pressure Medium Vapor | (b) Simple Condensation with a refrigeration loop |
| | (c) Generation of a High Vapor Pressure Medium Vapor | (c) Direct Compression followed by Simple condensation |
| | Direct Contact | (d) Solid-Liquid Phase Transformations |
| | (a) Generation of a Sub-Triple Point Medium Vapor | (e) Temperature Lifting Absorption |
| Step 2 | | |
| In-Situ Washing of the Surface of the Smooth Layer of Ice | Not Substantial | Not Substantial |

TABLE 1-continued

Summary of the Processing Steps of the High Performance In-Situ Freezing-Melting Processes

| Primary Processing Steps | Heat Interaction | Heat Upgrading and Medium Regeneration |
|---|---|---|
| Step 3 | | |
| In-Situ Melting of the Purified Smooth Ice Layer | Direct Contact Condensation of a Super-Triple Point Vapor | Generation of a Super-Triple Point Vapor |

An auxiliary heat interaction medium is used and is vaporized to form a first vapor to remove heat from the primary substance. The auxiliary medium may enter a direct contact heat interaction or an indirect contact heat interaction with the primary substance. In the direct case, a part of the primary liquid serves as the auxiliary medium. In the indirect case, one may use (a) a freezing point adjusted aqueous solution, denoted either as an FPA medium or as a B-solution, (b) a low vapor pressure liquid, or (c) a high vapor pressure liquid as the auxiliary medium.

In the direct case, the first vapor generated is a sub-triple point vapor which forms a mass of desublimate (ice) upon cooling without a substantial pressurization. The sub-triple point vapor can be transformed into a liquid mass by the two stage operation described in U.S. Pat. Nos. 4,420,318 and 4,505,728. The two stage liquefaction operation comprises a constant pressure desublimation step and a desublimate melting step. A refrigeration loop is used to accomplish the two stage liquefaction operation and the heat released in condensing the refrigerant is utilized to generate a super-triple point vapor that is used in Step 3. The sub-triple point vapor can also be subjected to a temperature lifting absorption operation utilizing a concentrated aqueous solution containing $CaCl_2$, LiBr and LiCl so that the absorbing temperature is higher than the triple point temperature of water by a sufficient margin such that the heat released in the absorption step is utilized to generate a super-triple point water vapor.

An FPA solution is an aqueous solution containing one or more low volatility solutes, such as NaCl, $CaCl_2$, LiCl and LiBr, such that its freezing temperature is lower than the freezing temperature of the feed by a sufficient margin so that it can be vaporized to remove heat of freezing the primary liquid without freezing itself. For example, the freezing points of aqueous $CaCl_2$ solutions containing 4.7%, 5.8%, 7.0%, 8.1%, 9.2% and 10.4% $CaCl_2$ are $-2.2°$ C., $-2.8°$ C., $-3.2°$ C., $-4.1°$ C., $-4.8°$ C. and $-5.9°$ C., respectively. Therefore, in conducting the first primary step of freezing a feed containing 2500 ppm NaCl (freezing temperature= $-0.145°$ C.), one may use an FPA solution containing 4.7% to 10.4% $CaCl_2$ and vaporize the FPA solution in the temperature range of $-2.2°$ C. to $-3°$ C. to generate a first vapor in the pressure range of 3 to 3.8 torrs. The first vapor generated is also a sub-triple point vapor and can be transformed to a liquid mass by either the two stage liquefaction or the temperature lifting absorption operation described in connection with the direct contact case. A stream of super-triple point vapor can also be generated by the ways described. It is noted that phase diagrams of $CaCl_2$—$H_2O$ system and Li-Br—$H_2O$ system are available in the following references:

(1) "Calcium Chloride Properties and Forms Handbook", published by Dow Chemical Company, USA, 2020 Willard H. Dow Center, Midland, Michigan 48674.

(2) "ASHRAE Handbook Fundamentals", published by American Society of Heating, Refrigerating and Air Conditioning Engineers.

A low vapor pressure medium is defined to be a substance that is used to remove heat of freezing in Step 1 to generate a first vapor whose pressure is so low that it cannot be compressed directly in a practical way. The first vapor can however be transformed into a liquid mass by a simple condensation operation involving a refrigeration loop. One may set the upper limit for the vapor pressure of low vapor pressure medium at around 100 torrs. Examples of some low vapor pressure mediums are ethanol, propanol, methanol and acetone. When a low vapor pressure substance is used as the auxiliary medium, the second vapor needed in Step 3 can be generated by utilizing the condensing heat of the refrigeration loop.

A high vapor pressure medium is defined to be a substance that is used to remove heat of freezing in Step 1 to generate a first vapor that is of such a pressure that it can be directly compressed to a pressure under which the vapor can be condensed to generate a second vapor which is a super-triple point vapor to be used in Step 3. In this case, there is no need for a separate refrigeration loop. Examples of high vapor pressure mediums are refrigerants used in commercial refrigeration machines, such as Freons, ammonia, etc.

Melting temperature of a substance varies as the applied pressure is varied. For example, the melting point of water is lowered by about 1° C. as the applied pressure is increased by 90–100 atmospheres, and the melting point of an organic substance increases by about 1° C. as the applied pressure is increased by 50 atmospheres. For example, the melting temperature of tridecane is $-5.5°$ C. under the ambient pressure and is raised to 1° C. under 300 atmospheres. A medium that remelts under a first temperature that is lower than the temperature of Step 1, say $-2°$ C., and a first pressure, say lower than the ambient pressure, and freezes under a second temperature that is higher than the temperature of Step 3, say 2° C., under a second pressure, say 200 atm may be used to condense or desublime the first vapor, upgrade the heat, and generate the second vapor.

A dilute non-aqueous solution can be treated in a similar way. Modifications to the processing steps are obvious to one skilled in the art. In a direct contact case and in case that a FPA medium is used as the auxiliary medium, the first vapors generated are sub-triple point vapors of the solvent of the feed being processed. In any case, the second vapor is a super-triple point vapor of the solvent. When a low vapor pressure medium or a high vapor pressure medium is used, the operational steps are very close to those of the aqueous solution case.

One of the unique features of the present invention is the combination of the in-situ formation of smooth deposit in Step 1 and the in-situ melting of purified smooth layer of solvent solid by a super-triple vapor in Step 3. The key to forming a smooth layer of solvent solid is to maintain a stable solid-liquid interface during the freezing operation. The interface stability is attained by (a) a proper agitation of the primary liquid near the solid-liquid interface and (b) a proper control of the freezing rate throughout the entire freezing front.

Figure 1A:
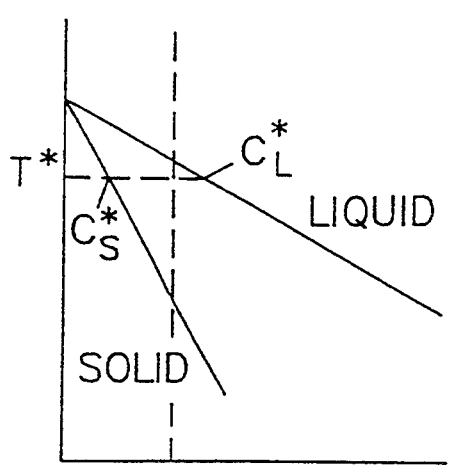
Figure 1B:
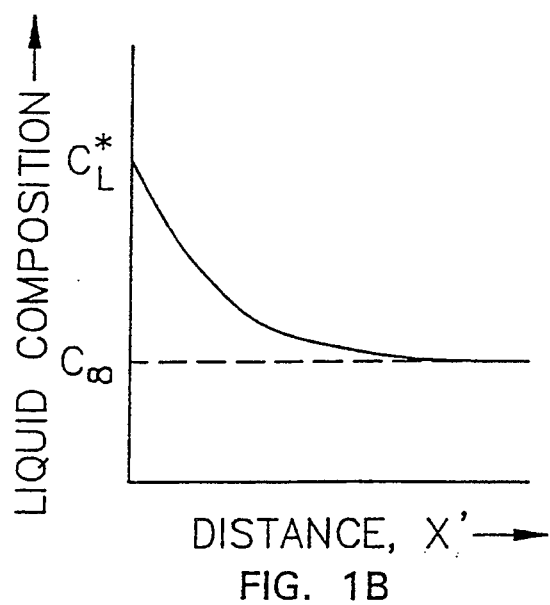
Figure 1C:
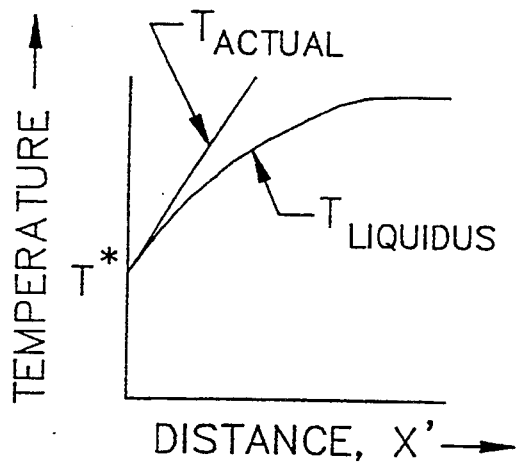
Figure 1D:
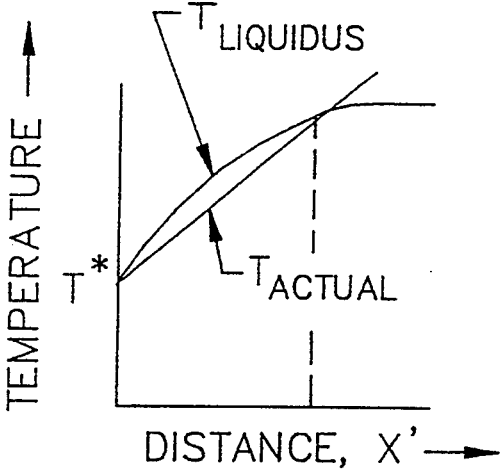
Figure 1E:
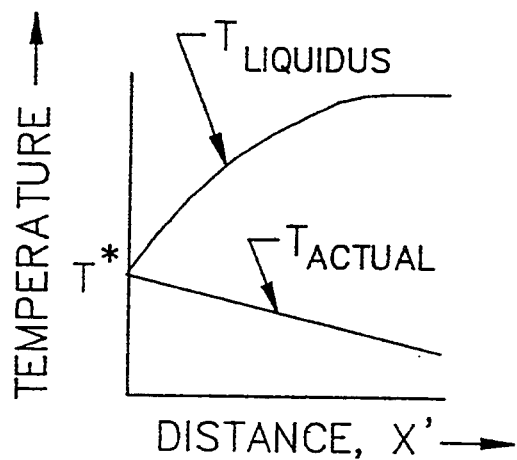

B. Chalmer and J. W. Rutter introduced the "Constitutional Supercooling Theory" for predicting solid-liquid interface stability in Canadian Journal of Physics, Volume 31, p. 15, 1953. According to the theory and referring to FIG. 1b, as a solution is frozen by an indirect contact cooling, a solute-rich layer is formed in front of the growing interface. In this layer, the solute concentration is a maximum $C_L^*$ at the interface and decreases with increasing distance from the interface. Now, with the aid of the phase diagram, illustrated by FIG. 1a, one can plot the equilibrium liquidus temperature of the liquid as a function of distance from the interface. The equilibrium liquidus temperature increases with distance from the interface because the lower the solute content, the higher the liquidus temperature. The profile of the liquidus temperature is shown in FIG. 1c, 1d and 1e. To this diagram, one can superimpose the actual temperature profile. Referring to FIG. 1c, when every point in front of the interface is at a temperature above the liquidus temperature, the growing solid-liquid interface is stable. Referring to FIG. 1d, when liquid immediately in front of the interface is at an actual temperature that is below its equilibrium liquidus temperature, the liquid is supercooled. Chalmers and coworkers termed this "constitutional supercooling"; the word constitutional indicates that the supercooling arises from a change in composition, not temperature. In other words, a constitutional supercooling is a supercooling induced by concentration distribution. FIG. 1e, illustrates the actual temperature profile and the equilibrium liquidus temperature profile when a liquid film formed on a solid surface is subjected to a vacuum freezing operation. A vacuum freezing operation is a solid-liquid-vapor three phase transformation operation in which solidification of liquid and vaporization of liquid take place simultaneously across a flowing liquid film. It shows that the actual temperature gradient ahead of the crystal is negative because the heat of crystallization released at the solid-liquid interface is transmitted through the liquid film and is removed by vaporization at the liquid-vapor interface. Since the equilibrium liquidus temperature profile is always positive, there is some degree of constitutional supercooling established in the S/L/V multiple phase transformation operation. Therefore, it can be stated that the solid-liquid interface formed in a direct contact freezing operation is by nature less stable than the interface formed in an indirect contact freezing operation. There are, however, some stabilizing factors that retard the onset of unstable growth that leads to development of irregular growth. The stability factors are related to nucleation of protuberance, which in turn is related to the anisotropy of surface energy. In any case, when the degree of constitutional supercooling exceeds a certain limit the interface becomes non-smooth such as cellular or dendritic. By a proper agitation of the interface liquid to enhance the transport of solute away from the interface, and maintaining a proper freezing rate, the interface stability can be maintained and a smooth solvent solid can be formed.

FIG. 2 illustrates the progress of the three primary steps when the heat interaction between the primary zone and the auxiliary zone is indirect. FIG. 2a illustrates a processing zone comprising a set of heat conductive walls 1, separating a primary zone 2 from an auxiliary zone 3. In initiating a first primary step (Step 1), a feed solution 4 is applied to the outside of the walls and a stream of an auxiliary medium 5 is applied to the inner surfaces of the walls. Heat transfer from the primary zone to the auxiliary zone takes place to result in formation of a smooth layer of solvent solid 6. It is shown that a thin layer 4 of primary liquid flows over the solid-liquid interface that constitutes the freezing front. The liquid near the freezing front is well agitated due to the flow of primary liquid forming the thin film. FIGS. 2b, 2c and 2d illustrate the progress of the in-situ freezing step. It is seen that the thickness of the smooth layer 6 of solvent solid increases. Even though the solid phase is substantially pure solvent, there is a thin layer of mother liquor retained on the surface. The impurity in the mother liquor phase will enter into the product. Therefore, in order to produce a high purity product, the mother liquid phase has to be separated from the smooth layer of solid. FIG. 2e shows that a mass of pure solvent 7 is applied on the outer surface of the smooth solid layer to thereby produce a purified smooth layer of solvent solid. FIGS. 2f and 2g illustrate the progress of the in-situ crystal melting step. The figures show that a stream of super-triple point solvent vapor 8 is brought in contact with the purified solid to simultaneously condense the vapor and melt the solvent solid to form a product liquid 9. It is seen that the solid is melted from outside toward the supporting solid wall. The solid to be melted remain held to the supporting solid wall. In this way, the solid is melted layer by layer in an orderly manner to give a reliable operation. FIG. 2g illustrates the end of the in-situ melting operation. It shows that the solid has been melted nearly completely. Then, the operations of the next cycle is initiated. As has been described, one of the unique features is the combination of (a) formation of a smooth solvent layer in Step 1 and (b) orderly melting of the purified solvent solid layer by bringing a stream of super-triple point vapor in contact with the purified solvent solid.

An auxiliary medium is heated in Step 1 to remove the latent heat of freezing that is released in the primary zone. In most cases, an auxiliary medium is vaporized to form a first vapor. In some cases, one may use an S/L medium that undergoes melting under a first temperature and a first pressure; in other cases, one may circulate an auxiliary medium that is simply heated without a phase change.

FIG. 3 illustrates the progress of the three primary steps when the heat interaction between the primary substance and the auxiliary medium is direct. In this case, a part of the feed is vaporized to form a first vapor and thereby remove the latent heat of freezing from the primary zone. The system illustrated by FIG. 3a comprises a vertical wall 10 with two surfaces and a means 11 for applying thin liquid films 12 on the outer surfaces of the wall. When the system is subjected to a low pressure which is lower than the vapor pressure of the primary liquid at its freezing temperature, simultaneous vaporization and freezing take place, resulting in the formation of a first vapor 13, and a layer of solvent solid 14. It is seen that the primary liquid near the solid-liquid interface is well agitated due to the flow of the thin liquid film. Under a proper operating condition, the solid formed is smooth or nearly smooth. FIGS. 3b, 3c and 3d show the progress of the in-situ freezing step wherein the thickness of the layer 14 increases. FIG. 3e illustrates the in-situ washing of the solvent solid layer; FIGS. 3f and 3g illustrate the progress of the in-situ melting steps. The operations of these steps are similar to those of the system illustrated by FIG. 2. It is noted that in the system of FIG. 3, a part of the feed is used as the auxiliary medium, and the primary zone and the auxiliary zone are directly connected without a separating wall between them.

It has been described that the first primary step of a process of the present invention can either be (a) a direct contact in-situ freezing operation or (b) an indirect contact in-situ freezing operation. These two types of operations are compared as follows:

(a) Separating Wall and Heat Transfer Resistance.

In an indirect contact operation, there is a heat conducting wall separating the primary zone from the auxiliary zone, and the heat released in the freezing operation passes through the layer of the solid phase that has been formed. In a direct contact operation, the primary zone is connected directly to the auxiliary zone. The heat released in the freezing operation passes through the thin liquid film. Therefore, the heat transfer resistance is considerably less in the direct operation. However, in an indirect operation, pressure differences between the primary zone and the auxiliary zone is so small that a relatively inexpensive heat conductive wall can be used. Therefore, it is not expensive to provide a large freezing surface and the issue of the added heat transfer resistance is not a major disadvantage for the indirect operation.

(b) Feed Composition and Product Quality.

It has been described that the interface of the freezing front tends to be less stable in a direct operation compared with an indirect operation. Therefore, an indirect operation can handle a more concentrated feed and the product quality is better.

(c) Choice of Auxiliary Mediums.

As has been described, various auxiliary mediums can be used in an indirect contact operation and the first vapor generated in many cases can be liquefied by a simple condensation operation. In contrast, in a direct operation, the auxiliary medium is a part of the feed liquid, and the first vapor generated is a sub-triple point vapor which can be liquefied by a more complicated operation, such as a two-stage liquefaction involving (a) desublimation and (b) desublimate melting or a temperature lifting first vapor absorption.

(d) Control.

In an indirect operation, a layer of solvent solid is formed only on the cooled surface. Therefore, it is easy to control the in-situ freezing operation. In a direct operation, a mass of solvent solid is formed from a mass of liquid whenever the liquid is exposed to the low pressure.

In summary, it is emphasized that the indirect in-situ freezing operations have many technological advantages in solvent purification and pollution prevention applications.

Processing systems of the present invention can be classified into several classes depending on whether the heat interaction between the primary substance and the auxiliary medium is direct or indirect, the auxiliary medium used, methods of upgrading heat and regeneration of the mediums.

FIG. 4 illustrates a Class 1 system in which a solution containing the solvent and one or more non-volatile solutes having a proper freezing temperature, denoted as a B-solution, is used as the auxiliary medium. This type of medium is referred to as a freezing point adjusted auxiliary medium and is also referred to simply as an FPA auxiliary medium or an FPA medium. The FPA medium is flash vaporized in the auxiliary zone at a temperature lower than the freezing temperature in the primary zone to generate a first vapor without freezing itself. The first vapor generated is a sub-triple point vapor and is subjected to a two stage liquefaction operation involving (a) desublimation and (b) desublimate melting operations. The system comprises an enclosure 13, a main partition 14, a first processing zone 15 to the left of the main partition, a second processing zone 16 to the right of the main partition, a first vapor passage 17 for transferring the first vapor from the first processing zone to the second processing zone and a second vapor passage 18 for transferring the second vapor from the second processing zone to the first processing zone.

The first processing zone 15 is divided by partitioning walls 19 and 20 into three sub-processing zones referred to respectively as A, B, C sub-processing zones. Each of these sub-processing zones are further divided by conducting walls 20A into primary sub-zones 21A, 21B and 21C and auxiliary sub-zones 22A, 22B and 22C. Feed solution is introduced into each primary sub-zone through feeding nozzles 23a, 23b and 23c, and excess primary liquid is discharged through openings 24a, 24b and 24c. An auxiliary medium is introduced into auxiliary sub-zones through feeding nozzles 25a, 25b and 25c and is collected at the bottom 26 of the first processing zone. There are vapor valves 20A, 20B, 20C for Z-1A, Z-1B and Z-1C.

The second processing zone 16 is divided by partitioning walls 27, 28 into three sub-processing zones referred to as A, B, C sub-processing zones. Each of these sub-zones contain a vapor processing zone Z-3A, 29a, Z-3B, 29b and Z-3C, 29c and a refrigeration zone Z-4A, 30a, Z-4B, 30b and Z-4C, 30c, a set of first vapor valves, 31a, 31b and 31c, and a set of second vapor valves 32a, 32b and 32c.

The operations in these sub-zones are properly staggered and the primary processing steps are similar to those described by referring to FIG. 2. Under the condition illustrated in FIG. 4, in-situ freezing takes place in the first and second primary sub-zones 21a and 21b and first vapor is generated in the first and second auxiliary sub-zones 22a and 22b. The first vapor passes through the first vapor passage 17 and is desublimed in the first and second vapor handling sub-zones 29a and 29b in the second processing zone. The solvent solid made in the third primary sub-zone 21c, is washed and the valve means is open. The second vapor is generated in the third vapor handling sub-zone 29C and the second vapor passes through the valving means 32C, through the second vapor passage 18 and valve 20C to enter the third primary zone 21C to thereby melt the purified solvent solid therein. A refrigeration loop is used to desublime the first vapor and generate the second vapor.

FIG. 5 illustrates a Class 2 system in which the interaction between the primary substance and the auxiliary medium is direct and a part of the feed solution is used as the auxiliary medium. The first vapor is generated by flash vaporizing the feed. The first vapor, being a sub-triple point vapor is subjected to a two stage liquefaction operation involving (a) desublimation and (b) desublimate melting operations. The construction and operation of this system are similar to those described for the Class 1 system of FIG. 4 except for the following changes:

(a) The first processing zone 15 is divided by partitions 33 and 34 into three sub-zones. Each sub-zone is provided with a set of vertical walls 35a, 35b and 35c and nozzles 36a, 36b and 36c for forming thin liquid films on the surfaces of the vertical walls. The primary steps conducted in each sub-zones are similar to those described in connection with FIG. 3.

(b) There are first vapor valves 37a, 37b and 37c and second vapor valves 38a, 38b and 38c in these sub-zones. While the first primary step is in progress in a sub-zone, its first vapor valve is open and its second vapor valve is closed; when the third primary step is in progress in a sub-zone, its first vapor valve is closed and its second vapor valve is open.

FIG. 6 illustrates a Class 3 system. In this system, the heat interaction between the primary substance and the auxiliary medium is indirect and a low vapor pressure substance is used as the auxiliary medium. The medium may be a pure substance or a mixture. A convenient mixture to use is a solution containing the solvent of the feed and one or more volatile solute. By adding a volatile solute, the first vapor generated can be transformed into a liquid mass by a simple condensation operation. Common substances to be used as the auxiliary mediums or as solutes to be used in mixtures are ethanol, methanol, propanol and acetone.

The system comprises an enclosure 39, a main processing zone 40 that is the middle zone in the vertical direction, a first-vapor condensing zone 41 and a second vapor generation zone 42. Since the first vapor is a low pressure vapor, it cannot be conveniently compressed. Therefore, a refrigeration loop is used to condense the first vapor, upgrade heat and generate the second vapor. A refrigeration loop 51 works between a first coil 43 and a second coil 44 to remove heat from a first vapor and thereby condense the first vapor around the first coil 43. The refrigerant vapor is compressed and the compressed vapor is condensed to supply heat to a mass of solvent to thereby generate a stream of second vapor in the second coil 44. The main processing zone is divided by vertical partitions 45, 46, 47 into four sub-zones and each sub-zone is further divided by vertical heat conductive walls 48a, 48b, 48c and 48d into primary sub-zones, Z-1A 49a, Z-1B 49b, Z-1C 49c, and Z-1D 49d, and auxiliary sub-zones, Z-2A 50a, Z-2B 50b, Z-2C 50c and Z-2D 50d. The operations conducted in these sub-zones are similar to those described for a Class 1 system except that the auxiliary medium is a low vapor pressure medium that can be transformed into a liquid mass by a simple condensation operation. There are vapor valves 51A, 51B, 51C, 51D for Z-1A, Z-1B, Z-1C and Z-1D.

The condition illustrated by FIG. 6 shows that the first primary step is in progress in the first, second and fourth primary sub-zones to generate the first vapor and the third primary step is in progress in the third primary sub-zone. The operations conducted in these sub-zones are similar to those described in connection with FIG. 2. The first vapor generated is condensed on the first coil to vaporize a refrigerant; the refrigerant vapor is compressed by a compressor 51 and the compressed refrigerant vapor is condensed in the second coil to vaporize a mass of the solvent to generate a stream of second vapor. The second vapor is brought in contact with the purified solvent solid in the third primary sub-zone to melt the solvent solid. The vapor valves 51A, 51B, 51D are closed and the vapor valve 51C is open.

FIG. 7 illustrates a Class 4 system. This system is very similar to Class 3 system illustrated by FIG. 6. The differences between the two systems are as follows:

(a) A high vapor pressure substance, such as a refrigerant used in a commercial refrigeration machine is used as the auxiliary medium;

(b) The first vapor generated is directly compressed by a compressor 52. Therefore, the first coil is not needed;

(c) The compressed medium vapor is condensed in the second coil to generate a stream of the second vapor, which is used to melt the solvent solid;

(d) The medium liquid is depressurized through a throttle valve 52a and returned to the bottom of the vessel and the low pressure medium is introduced into the auxiliary sub-zones by a refrigerant pump 52b.

FIG. 8 illustrates a Class 5 system, in which a medium, referred to as an S/L medium, that undergoes melting under a first pressure and a first temperature and solidify under a second pressure and a second temperature is utilized to remove the heat released in the in-situ freezing step conducted in the primary zone and supply the heat needed in the in-situ melting step conducted in the primary zone. The first temperature is lower than the temperature of the in-situ freezing step; the second temperature is higher than the temperature of the in-situ melting step. The melting temperature of a substance varies with the applied pressure. For most substances, the melting points are raised by about 1° C. as the applied pressure is raised by 50 atmospheres. In case of water, the melting temperature is lowered by 1° C. as the applied pressure is increased by 100 atmospheres. This shifting in melting temperatures due to change in applied pressure is utilized in upgrading the heat energy. Tridecane has a melting temperature of $-5.5°$ C. under atmospheric pressure and has a melting temperature of 2° C. under about 375 atmosphere. Therefore, it can absorb the heat released in the first primary step under a low pressure and supply the heat needed in the third primary step under a high pressure.

The system of FIG. 8 comprises a vertical enclosure 53, a main processing zone 53a, first vapor passages 54a, 54b, and second vapor passages 55a, 55b. There are two main processing sub-zones 56, 57 and two (S/L) medium sub-zones 58, 59. Each of the two main processing sub-zones has primary processing sub-zones Z-1A 60 and Z-1B 61, and auxiliary processing sub-zones Z-2A 62 and Z-2B 63. Each of the two (S/L) medium zones has multivoid heat conductive plates Z-3A 64 and Z-3B 65 and vapor handling sub-zones Z-4A 66 and Z-4B 67. The (S/L) medium is contained within the conduits 64a, 65a of the multivoid plates. There are first vapor valves 68A, 68B for Z-2A and Z-2B; there are first vapor valves 69A, 69B for Z-4A and Z-4B; there are second vapor valves 70A, 70B for Z-1A and Z-1B; there are second vapor valves 71A, 71B for Z-4A and Z-4B.

In-situ freezing and melting take place cyclically and alternately in the two primary processing sub-zones, and melting and solidification of the (S/L) medium take place in the two sets of multivoid plates in Z-3A and Z-3B. Under the condition illustrated by FIG. 8, a feed solution is applied in Z-1A and an auxiliary medium is applied in Z-2A to thereby form a smooth layer of solvent solid in Z-1A 60 and generate a first vapor in Z-2A, 62. With vapor valves 68a, 69a of sub-zones Z-2A and Z-4A opens and vapor valves 70a and 71a of sub-zones Z-1A and Z-4A closed, the first vapor $V_{24}$ generated in Z-2A passes through the first vapor passage and enters Z-4A sub-zone and desublimes or condenses therein. The (S/L) medium in Z-3A sub-zone is melted to remove heat from the first vapor. The (S/L) medium in Z-3B sub-zone is pressurized to raise its melting temperature and a mass of solvent liquid is applied in Z-4B sub-zone to thereby generate second vapor. With valves 70b, 71b on sub-zones Z-1B and Z-4B open and valves 68b and 69b of sub-zones Z-2B and Z-4B closed, the second vapor $V_{41}$ enters Z-1B sub-zone to melt the purified solvent solid formed during the first primary step of the preceding cycle.

FIG. 9 illustrates a Class 6 system. In this system, the first vapor is subjected to a temperature lifting absorption operation and the heat of absorption is utilized to generate the second vapor to be used in the third primary step. The system also utilizes a freezing point adjusted solution, an FPA solution, to serve as the auxiliary medium. The system comprises an enclosure 72 that encloses the following zones:

(a) Three main processing zones 73A, 73B and 73C containing three primary processing zones Z-1A 74A, Z-1B 74B and Z-1C 74C, and auxiliary processing zones, Z-2A 75A, Z-2B 75B, and Z-2C 75C;

(b) Means of feeding 76A, 76B, 76C feed liquid $L_{01}$ into the primary processing zones, valving means 77A, 77B, 77C for controlling the feeding, opening 78A, 78B, 78C for discharging the primary liquid $L_{10}$, means for feeding 79A, 79B, 79C the auxiliary medium into the auxiliary processing zones, valving means 80A, 80B, 80C for controlling the feeding of the auxiliary medium, vapor flow controlling valves 81A, 81B, 81C for controlling the flow of second vapor into the three primary processing zones.

(c) A vapor handling zone comprising a temperature lifting first vapor absorption zone 82, Z-3, and a second vapor generation zone 83, Z-4, means for feeding 84 a first absorbing solution $J_{03}$ into Z-3, means of feeding 85 a solvent stream $L_{04}$ into Z-4, openings for discharging 86 the primary liquid $L_{40}$ from Z-4.

(d) An auxiliary heat rejection zone 87, Z-5, a spraying means 88 for feeding a second absorbing solution $J_{05}$ into Z-5, and an auxiliary cooling coil 89 for removing heat of absorption from Z-5.

(e) A first vapor passage 90 for transferring the first vapor $V_{23}$ from Z-2 to Z-3 and a second vapor passage 91 for transferring the second vapor $V_{41}$ from Z-4 to Z-1.

The operations in the three main processing zones are staggered and the operations in Z-3, Z-4 and Z-5 are continuous. Under the conditions illustrated by FIG. 9, the following operations take place in the processing zones:

(a) The vapor valves 81A, 81C of Z-1A and Z-1C are closed and the vapor valve 81B of Z-1B is open. Feed liquid $L_{01}$ is added through valves 77A and 77C and feeding means 76A and 76C into Z-1A 74A and Z-1C 74C and excess primary liquid $L_{10}$ is discharged through openings 78A and 78C. Auxiliary medium $B_{02}$ is admitted through valve 80A and 80C and feeding means 79A and 79C into Z-2A and Z-2C. The auxiliary medium vaporizes to form a first vapor stream $V_{23}$ in Z-2A and Z-2C and forms a concentrated auxiliary medium $B_{20}$. Water is added to $B_{20}$ and recycled as $B_{02}$. Smooth solvent solid layers are formed in Z-1A and Z-1C.

(b) A first absorbing solution $J_{03}$ is admitted through the feeding means 84 to form thin absorbing solution films in Z-3. A solvent stream $L_{04}$ is admitted through feeding means 85 to form thin films in Z-4. The first vapor $V_{23}$ enters Z-3 and is subjected to temperature lifting absorbing operation. The heat of absorption is transmitted to the solvent liquid film in Z-4 to thereby generate a stream of second vapor, $V_{41}$ and $V_{45}$. The diluted absorbing solution $J_{30}$ is reconstituted by an evaporation operation and returned as $J_{03}$.

(c) Due to a prior freezing operation, a mass of solvent solid exists on the walls of Z-1B. With vapor valve 81B open, a major part of the second vapor $V_{41}$ enters Z-1B to thereby simultaneously condense the second vapor and melt the solvent solid. The primary liquid $W_{10}$, which contains both the melt and the condensate is discharged through opening 78B.

(d) Due to heat leakage and work input to the system, there is an excess second vapor $V_{45}$ that has to be liquified. One way is to absorb the excess second vapor into the second absorbing solution $J_{05}$ that is introduced through the nozzle 88 and the heat of absorption is removed by a stream of cooling water that enters the coil 89 as $M_{05}$ and discharged as $M_{50}$. The diluted absorbing solution $J_{50}$ is reconstituted by an evaporation or other operations and returned as $J_{05}$.

New heat upgrading heat transfer panels have been conceived and their uses in purification of dilute solutions are disclosed in the present application. It is noted that these heat upgrading heat transfer panels have broad applications such as in air conditioning, chillers and other refrigerations in general. A heat upgrading heat transfer panel is also referred to simply as a heat upgrading panel and also as a HUHT panel. Each HUHT panel has a thin heat conductive enclosure heaving a first dimension referred to as thickness, a second dimension referred to as width and a third dimension referred to as length. A HUHT panel is made either by two sheets of heat conductive material or by folding a long piece into two walls separated a short distance apart. A HUHT panel has an internal region inside of the enclosure, and the internal region is divided into a first internal region and a second internal region. In use, an auxiliary medium and an absorbing solution are applied as thin films to the two internal regions alternately, so that a stream of first vapor is generated in one region and the first vapor moves to the other region to be subjected to a temperature lifting first vapor absorption operation. The region outside of the first vapor generation region becomes a cooling region; the region outside of the absorption region becomes a heated region. A panel may be divided into two internal regions in the thickness direction or in a second direction that is perpendicular to the thickness direction, normally referred to as the width direction. A Type-A HUHT panel refers to a panel in which the division is in the width direction; a Type-B HUHT panel refers to a panel in which the division is in the thickness direction. A barrier is used to separate the internal region into two internal regions and thereby keep the two liquid streams, viz. the auxiliary medium and the absorbing solution, separated while allowing the first vapor to pass through. In a Type B panel, the first vapor passes through a very short distance in the thickness direction through a very large cross sectional area. The thickness of a Type B panel can be pretty thin. In a Type A panel, the first vapor passes through the width direction.

Therefore, the thickness of the panel has to be properly selected to minimize the pressure drop.

FIGS. 10 and 11 respectively illustrate Class 6A and Class 6B systems. Type A HUHT panels are used in a Class 6A system and Type B HUHT panels are used in a Class B system. Operations of these two classes of systems are quite similar to those described for the Class 6 system.

FIG. 10 illustrates a Class 6A system having an enclosure 92 and three Type A HUHT panels 93A, 93B and 93C. The internal regions of panels are separated by internal liquid separating barriers 94 into the first internal regions 95A, 95B and 95C and the second internal regions 96A, 96B and 96C. The regions outside of the panels are also separated by external barriers 97 into the first external regions 98 and the second external regions 99.

Functionally, there are four zones in the system: (a) crystal forming zone, denoted as Z-CR, (b) crystal melting zone, denoted as Z-MT, (c) an auxiliary medium zone which is also a heat removal zone, denoted as Z-B, and (d) a temperature lifting first vapor absorption zone which is also a heat supplying zone, denoted as Z-J. The auxiliary sub-zones in the three panels are denoted as Z-B1, Z-B2 and Z-B3 and the temperature lifting absorption sub-zones in the three panels are denoted as Z-J1, Z-J2 and Z-J3.

Figure 10A:
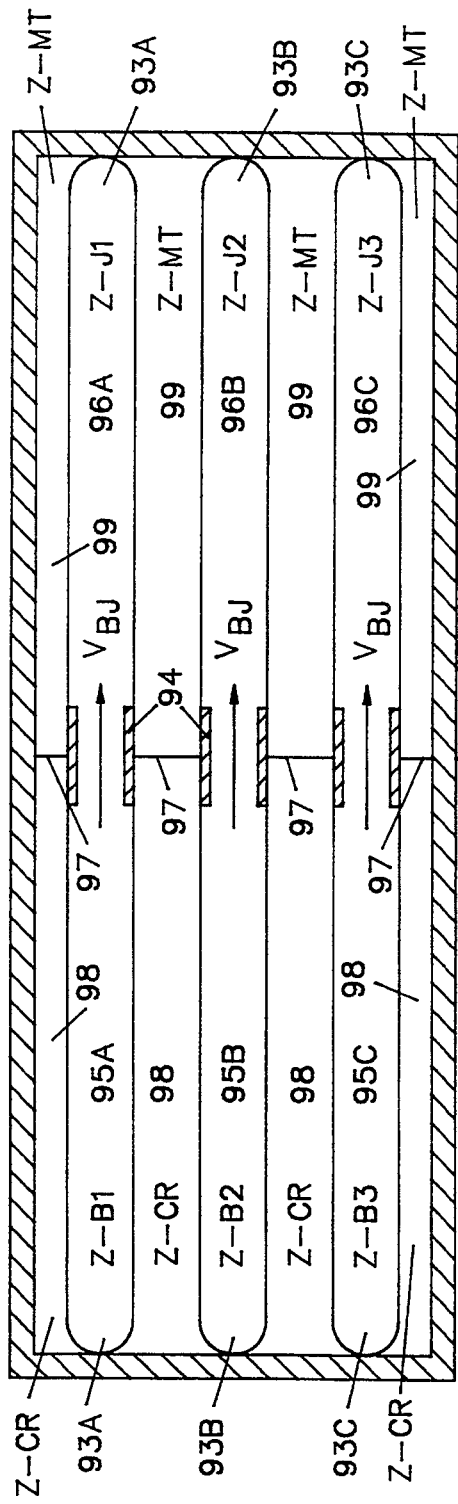
Figure 10B:
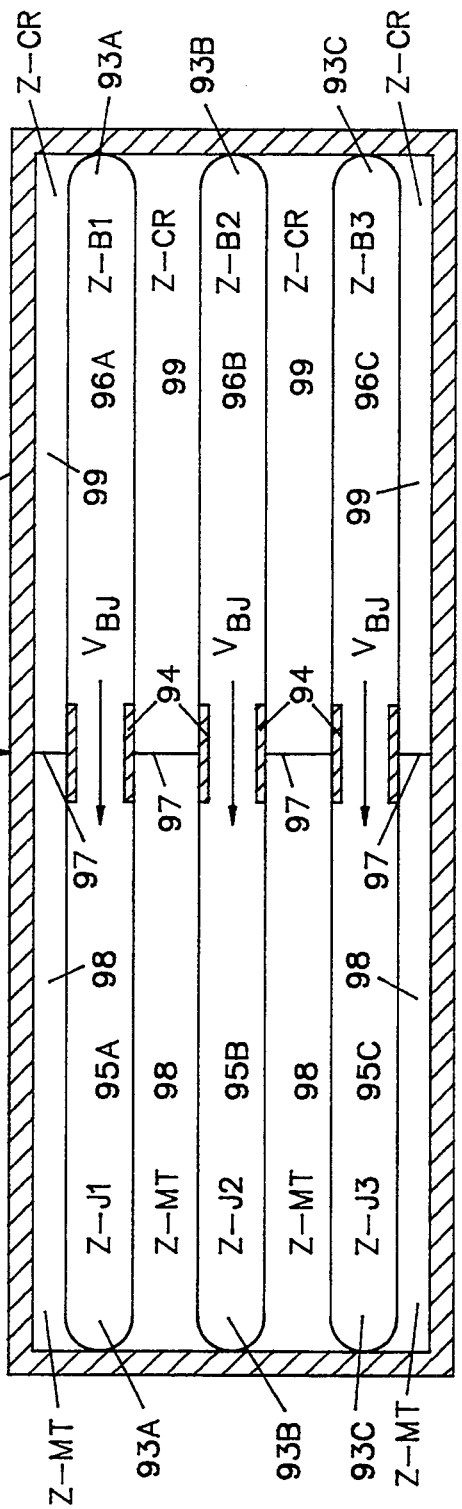

The system undergoes a cyclic process and a cycle comprises a first main period, a first intermission period, a second main period and a second intermission period. During the two main periods, the in-situ crystal formation and the in-situ crystal melting steps take place simultaneously and alternately in the first external region and the second external region and generation of first vapor and absorption of the first vapor also take place simultaneously and alternately in the first internal region and the second internal region. FIG. 10A illustrates the condition of the system during the first main period; FIG. 10B illustrates the condition of the system during the second main period. Referring to FIG. 10A, during the first main period, the first external region 98 serves as the crystal formation zone, the second external region serves as the crystal melting zone, the first internal region serves as the auxiliary medium region in which the first vapor is generated and the second internal region serves as the temperature lifting vapor absorption zone. Heat released in crystal formation in Z-CR is removed by generation of first vapor in Z-B1, Z-B2 and Z-B3 of the three panels; the first vapor is absorbed into an absorbing solution in Z-J1, Z-J2 and Z-J3 in the three panels; the heat released in the absorption operation is utilized in melting the crystals. During this period, feed is added to Z-CR and a mass of solvent liquid is applied to Z-MT. Since once a thin layer of solvent solid is melted, the solvent solid is separated from the external panel surface in Z-MT zone, direct heat transfer between the panel and the solvent solid ceases. Therefore, the heat is transferred by generating a stream of second vapor that gets in contact with the solvent solid to accomplish the melting. The condition of the system during the second main period is illustrated in FIG. 10B. During this period, the second external region becomes the crystal melting zone, the first external region becomes the crystal formation zone, the second internal region becomes the auxiliary medium zone and the first internal region becomes the temperature lifting vapor absorption zone. The operations taking place in these regions are the same as those described during the first main period.

FIG. 12 illustrates a Class 6B system having an enclosure 92 and three Type B HUHT panels 93A, 93B and 93C. The internal regions of the panels are separated by internal liquid separating barriers 94 that are placed half-way in the thickness direction into the first internal regions 95A, 95B, 95C and the second internal regions 96A, 96B, 96C. The regions outside the panels are also separated by external barriers 97 or by close fitting of the panels against the enclosure walls into a first external region 98 and a second external region 99. The operations of Class 6B systems are the same as those of the Class 6A system. Therefore, equivalent parts are given same designation numbers, so that the structures and operations described for Class 6A system can be applied also to the Class 6B system.

It is noted that the first vapor generated in the Class 6B system travels a very short distance through a large cross sectional area. Therefore, the pressure drop is very small. The thickness of a Type B HUHT panel can be made rather thin, say less than 0.5 inch or even less than 0.25 inch. This makes it possible to manufacture a very compact in-situ freezer-melter.

It is noted that the use of temperature lifting first vapor absorption approach can be applied to any type of first vapor and the heat of absorption is thereby utilized in generating a stream of super-triple point vapor to be used in the third primary step. The use of a temperature lifting absorption step eliminates the need for a mechanical compressor. The use of the temperature lifting first vapor absorption approach is not limited to processing a sub-triple point first vapor. It is useful even when the first vapor is a super-triple point vapor or a vapor mixture. The first vapor may be a low pressure vapor or even a high pressure vapor.

For example, in the Class 6, 6A and 6B systems, one may also use a low vapor pressure substance such as ethanol, methanol, acetone and propanol as the auxiliary medium to remove the latent heat released in the first primary step to thereby generate a first vapor and subject the first vapor to a temperature lifting first vapor absorption by absorbing it into a low volatility absorbing medium such as a hydrocarbon or a mixture of hydrocarbons and utilize the heat of absorption to generate the second vapor needed in the third primary step.

There are other applications for the heat upgrading heat transfer panels besides the applications described. In many cases, these HUHT panels can be operated continuously. Some applications are air conditioning, liquid chilling, refrigeration, and vapor pressure enhancing. Referring to FIGS. 10A and 11A, and by introducing B-solution into Z-B1, Z-B2 and Z-B3 regions and introducing J-solution to Z-J1, Z-J2 and Z-J3 regions, heat is removed from the Z-CR region continuously and heat is rejected to Z-MT region continuously. Therefore, the units can be used as heat pumps. Each one of them can, therefore, be used as a refrigerator, a liquid chiller, or an air conditioner. By introducing a first vapor of a first substance under a first pressure and a first condensing temperature into the Z-CR region and introducing a mass of volatile liquid of a second substance in the Z-MT region, the first vapor can be condensed at the first temperature and a second vapor can be generated at a second temperature that is higher than the first temperature. When the second substance and the first substance are the same substance, than the second pressure is higher than the first pressure. The unit then becomes a vapor pressure enhancer and performs a function that is similar to that of a mechanical compressor.

Key features and advantages of the processes of the present invention are summarized as follows:

1. Universal Pollutant Removal

One of the unique feature is its ability to remove almost all of the pollutants from waste water. This feature is referred to as "Universal pollutant removal." The processes can remove the following pollutants:
 (a) Toxic dissolved gases, such as hydrogen sulfide;
 (b) Volatile organics, such as benzene, toluene, and dichloroethane;
 (c) Low volatility organics;
 (d) Dissolved salts, acids, alkalines and heavy metals;
 (e) Finely suspended and colloidal solid particles.

In each process, dissolved solute are rejected from the smooth layer of ice due to the low solubilities of the solutes into the solid ice phase and suspended liquid droplets and/or suspended particulates are washed down due to the agitation of liquid near the solid-liquid interface at the freezing front. Similar features apply to processing of non-aqueous mixtures.

2. High Degree Separation

The solubilities of most solutes in ice are very small. Therefore, the product quality depends only on how well mother liquor is separated from ice. Due to the formation of a smooth ice layer, there is only a thin mother liquor layer retained on the ice surface. It is a relatively simple operation to wash away the thin layer of mother liquor. There is no need for an elaborate wash column as is the case in other freezing processes.

3. High Degree Concentration

Since the feed solution is a dilute solution, a large fraction of the feed can be transformed into solvent solid. Therefore, all the contaminants can be concentrated into a small mass for easy disposal or value recovery. For example, a dilute aqueous stream with organics can be processed to produce a large amount of reusable water and a small mass of concentrate. The concentrate can be economically disposed by wet oxidation or by incineration. A valuable product may be recovered from the concentrate.

4. Unique Auxiliary Heat Interaction Mediums

The present invention has introduced the following novel auxiliary heat interaction mediums:
 (a) Freezing Point Adjusted Solutions,
 (b) Low Vapor Pressure Mediums,
 (c) High Vapor Pressure Mediums,
 (d) Solid-Liquid Transformation Mediums.

Upon receiving heat, these mediums undergo (a) melting, (b) vaporization, (c) desorption, and (d) simple temperature rise. These transformations are collectively referred to as endothermic transformations.

5. High Rate Primary steps

Rate of conducting the first primary step is enhanced by formation of only a thin layer of solvent solid, while the liquid near the freezing front is well agitated; rate of conducting the third primary step is enhanced by layer direct contact melting of the solvent solid layer by a stream of super-triple point vapor from the outer surface toward the supporting surface.

6. Low Cost Freezer Surface

Since the pressure difference between the primary zone and the auxiliary zone is small in most cases, the freezer surface can be made of a thin layer of heat conductive material, including metals and plastics. Therefore, the cost per unit area of the freezer surface is very low. Therefore, one can afford to operate at a small driving force for heat transfer.

7. Unique Ways of Upgrading Heat

Depending on the auxiliary medium used, unique ways of upgrading heat energy have been incorporated. These are (a) two stage liquefaction of a sub-triple point vapor, (b) temperature lifting first vapor absorption, (c) coupling of a refrigeration loop with the use of a low vapor pressure auxiliary medium, (d) direct compression of a high vapor pressure auxiliary medium, and (e) use of a (S/L) medium.

8. Low Operating Cost

Since small driving forces are being used in all the primary steps and the auxiliary steps, the power consumption is low.

9. Heat Upgrading Heat Transfer Panels

Unique heat upgrading heat transfer panels have been introduced. These panels have broad fields of applications. When they are adapted in the present processes, the equipment costs are greatly reduced.

What is claimed are as follows:

1. A process of separating a mixture containing a crystallizable solvent, denoted as A-component, and one or more non-solvent components, dissolved and/or suspended, individually denoted as serious $B_1$, $B_2$, →, and $B_N$ and collectively denoted as B-components, into a first product that is purified solvent and a second product enriched with the non-solvent components by subjecting a mass of the feed mixture to a cyclic operation and each cycle comprises:

(1) A first primary step of applying a mass of liquid derived from the feed on a set of solid surfaces, referred to as solidification surfaces, in a primary processing zone and removing heat from the primary processing zone to thereby form a layer of solvent solid from the liquid on each of the set of the solidification surfaces, thereby forming a solid-liquid interface, while agitating the liquid near the solid-liquid interface, and discharging a mass of liquid from the primary zone as the second product;

(2) A second primary step of separating the liquid from the layer of the solvent solid on each of the solidification surfaces; and (3) A third primary step of bringing a stream of super-triple point solvent vapor whose pressure is somewhat higher than the triple point pressure of the solvent in contact with the solvent solid to thereby simultaneously melt the solvent solid and condense the super-triple point solvent vapor and thereby produce a mass of purified solvent liquid, a major fraction of the purified solvent liquid constituting the first product;

(4) A first auxiliary step of subjecting an auxiliary heat auxiliary processing zone and establishing a heat interaction between the primary processing zone interaction medium to an endothermic transformation in an and the auxiliary processing zone to thereby transfer the heat released in the first primary step to supply the heat used in the first auxiliary step.

2. A process of claim 1, wherein the feed is an aqueous mixture and the solvent is water.

3. A process of claim 1, wherein the feed is a non-aqueous mixture and the solvent is a non-aqueous substance.

4. A process of claim 1, wherein there are a set of heat conductive walls separating the primary zone from the auxiliary zone and the heat interaction is indirect so that the heat released in the first primary step in the primary zone passes through the heat conductive walls to induce the endothermic transformation of the auxiliary medium in the auxiliary processing zone.

5. A process of claim 1, wherein the auxiliary zone is directly connected to the primary zone, and a portion of the feed liquid serves as the auxiliary medium and is vaporized to generate a first vapor and remove the heat released in the first primary step.

6. A process of claim 4, wherein the auxiliary medium is subjected to a vaporization operation to generate a first vapor.

7. A process of claim 6, wherein the first vapor is subjected to a temperature lifting absorption operation thereby the first vapor is absorbed into an absorbing solution of such a composition that the absorption takes place at a temperature higher than the melting temperature of the solvent solid and the heat of absorption is utilized to generate a second vapor which becomes the super-triple point vapor that is used in conducting the third primary step.

8. A process of claim 6, wherein the auxiliary medium used is a solution, denoted as an FPA medium, containing the solvent of the feed mixture and one or more solutes of such concentrations that the solution can be vaporized at a temperature lower than the temperature of the first primary step without freezing the solution, and during a first primary step, the FPA medium is vaporized to generate a first vapor whose pressure is lower than the triple point pressure of the solvent.

9. A process of claim 8, wherein the first vapor is transformed into a liquid mass by a two stage operation involving (a) desublimation of the first vapor to form a mass of desublimate and (b) melting the desublimate.

10. A process of claim 8, wherein the first vapor is subjected to a temperature lifting absorption operation thereby the first vapor is absorbed into an absorbing solution of such a composition that the absorption takes place at a temperature higher than the melting temperature of the solvent solid and the heat of absorption is utilized to generate a second vapor which becomes the super-triple point vapor that is used in conducting the third primary step.

11. A process of claim 6, wherein the auxiliary medium used is a substance or a mixture of substances that vaporizes under a pressure lower than 100 torrs to generate a first vapor and remove the heat released in the first primary step and the first vapor is transformable into a liquid mass by a simple condensation operation.

12. A process of claim 11, wherein a major component of the auxiliary medium used is chosen from ethanol, methanol, acetone and propanol.

13. A process of claim 11, wherein the first vapor is transformed into a liquid mass by a simple condensation operation.

14. A process of claim 11, wherein the first vapor is subjected to a temperature lifting absorption operation thereby the first vapor is absorbed into an absorbing solution of such a composition that the absorption takes place at a temperature higher than the melting temperature of the solvent solid and the heat of absorption is utilized to generate a second vapor which becomes the super-triple point vapor that is used in conducting the third primary step.

15. A process of claim 6, wherein the auxiliary medium used is a substance or a mixture of substances that vaporizes under a pressure higher than 50 torrs to generate a first vapor and remove the heat released in the first primary step and the first vapor is directly compressed and the compressed vapor is condensed to generate the super-triple point solvent vapor used in the third primary step.

16. A process of claim 4, wherein the auxiliary medium denoted as an S/L-type medium, melts under a first temperature and under a first pressure to remove the heat released in the first primary step and solidifies under a second temperature under a second pressure to generate the super-triple point vapor used in the third primary step.

17. A process of claim 6, wherein the first vapor is brought into an indirect contact heat interaction with another auxiliary medium, denoted as an S/L-type medium, to thereby melt the medium under a first temperature and a first pressure and the S/L-type medium is solidified under a second temperature and second pressure to generate the super-triple point vapor used in the third primary step.

18. A process of claim 4, wherein each of the set of heat conductive walls separating the primary processing zone and the auxiliary processing zone is substantially vertical wall having a first surface and a second surface, the two sides across the wall and bounded by the two surfaces being respectively denoted as the first-side and the second-side, and during the first primary step, a mass of liquid derived from the feed is applied on the first side of the wall to form a first liquid film and a mass of auxiliary medium is applied on the second side of the wall to form a second liquid film and thereby induce the heat interaction between the two zones and form a layer of solvent solid on the first surface and subject the auxiliary medium to the endothermic transformation.

19. A process of claim 18, wherein the auxiliary medium is subjected to a vaporization operation to generate a first vapor.

20. A process of claim 19, wherein the first vapor is subjected to a temperature lifting absorption operation thereby the first vapor is absorbed into an absorbing solution of such a composition that the absorption takes place at a temperature higher than the melting temperature of the solvent solid and the heat of absorption is utilized to generate a second vapor which becomes the super-triple point vapor that is used in conducting the third primary step.

21. A process of claim 20, wherein the process is conducted in a system that is divided by a set of panel enclosures made of heat conductive walls into an internal region that is within the enclosures and an external region that is outside of enclosures, the internal region being further divided into a first internal region and a second internal region, the external region being also divided into a first external region and a second external region that are respectively in heat interaction relations with the first internal region and the second internal region through the heat conductive walls, and the process is conducted cyclically and each cycle comprises a first main period, a first transition period, a second main period and a second transition period, the process during the first main period comprises:

(a) Step 1 of conducting a first primary step of forming a mass of solvent solid in the first external region;

(b) Step 2 of conducting a first auxiliary step of vaporizing a mass of the auxiliary medium in the first internal region to thereby generate a stream of first vapor;

(c) Step 3 of subjecting the first vapor to the temperature lifting first vapor absorption in the second internal region;

(d) Step 4 of generating a stream of second vapor which is the super-triple point vapor used in the third primary step in the second external region; the heat generated in Step 1 being used to supply the heat needed in Step 2, the heat generated in Step 3 being used to supply the heat needed in Step 4, the first vapor being transferred from the first internal region to the second internal region, the process during the second main period comprises:

(a) Step 1 of conducting a first primary step of forming a mass of solvent solid in the second external region;

(b) Step 2 of conducting a first auxiliary step of vaporizing a mass of the auxiliary medium in the second internal region to thereby generate a stream of first vapor;

(c) Step 3 of subjecting the first vapor to the temperature lifting first vapor absorption in the first internal region;

(d) Step 4 of generating a stream of second vapor which is the super-triple point vapor used in the third primary step in the first external region;

the heat generated in Step 1 being used to supply the heat needed in Step 2, the heat generated in Step 3 being used to supply the heat needed in Step 4, the first vapor being transferred from the second internal region to the first internal region.

22. A process of claim 21, wherein each of the panel enclosure comprises two heat conductive walls spaced a distance apart, the enclosure having a thickness direction that is perpendicular to the walls, a width direction and a length direction that are perpendicular to each other and are perpendicular to the thickness direction, the interior of each enclosure being divided in the width direction into a first internal region and a second internal region.

23. A process of claim 21, wherein each of the panel enclosure comprises two heat conductive walls spaced a distance apart, the enclosure having a thickness direction that is perpendicular to the walls, a width direction and a length direction that are perpendicular to each other and are perpendicular to the thickness direction, the interior of each enclosure being divided in the thickness direction into a first internal region and a second internal region.

24. A process of claim 19, wherein the auxiliary medium used is a solution, denoted as an FPA medium, containing the solvent of the feed mixture and one or more solutes of such concentrations that the solution can be vaporized at a temperature lower than the temperature of the first primary step without freezing the solution, and during the first primary step, the FPA medium is vaporized to generate a first vapor whose pressure is lower than the triple point pressure of the solvent.

25. A process of claim 24, wherein the first vapor is transformed into a liquid mass by a two stage operation involving (a) desublimation of the first vapor to form a mass of desublimate and (b) melting the desublimate.

26. A process of claim 24, wherein the first vapor is subjected to a temperature lifting absorption operation thereby the first vapor is absorbed into an absorbing solution of such a composition that the absorption takes place at a temperature higher than the melting temperature of the solvent solid and the heat of absorption is utilized to generate a second vapor which becomes the super-triple point vapor that is used in conducting the third primary step.

27. A process of claim 19, wherein the auxiliary medium used is a substance or a mixture of substances that vaporizes under a pressure lower than 100 torrs to generate a first vapor and remove the heat released in the first primary step and the first vapor is transformable into a liquid mass by a simple condensation operation.

28. A process of claim 27, wherein a major component the auxiliary medium used is chosen from ethanol, methanol, acetone and propanol.

29. A process of claim 27, wherein the first vapor is transformed into a liquid mass by a simple condensation operation.

30. A process of claim 27, wherein the first vapor is subjected to a temperature lifting absorption operation thereby the first vapor is absorbed into an absorbing solution of such a composition that the absorption takes place at a temperature higher than the melting temperature of the solvent solid and the heat of absorption is utilized to generate a second vapor which becomes the super-triple point vapor that is used in conducting the third primary step.

31. A process of claim 19, wherein the auxiliary medium used is a substance or a mixture of substances that vaporizes under a pressure higher than 50 torrs to generate a first vapor and remove the heat released in the first primary step and the first vapor is directly compressed and the compressed vapor is condensed to generate the super-triple point solvent vapor used in the third primary step.

32. A process of claim 19, wherein the first vapor is brought into an indirect contact heat interaction with another auxiliary medium, denoted as an S/L-type medium, to thereby melt the medium under a first temperature and a first pressure and the S/L-type medium is solidified under a second temperature and second pressure to generate the super-triple point vapor used in the third primary step.

33. An apparatus for separating a mixture containing a crystallizable solvent and one or more non-solvent components, dissolved and/or suspended, into a first product that is purified solvent and a second product enriched with the non-solvent components by subjecting a mass of the feed mixture to a cyclic operation therein that comprises:
  (a) an outer enclosure,
  (b) one or more processing zone within the outer enclosure,
  (c) a primary processing zone and an auxiliary processing zone within each processing zone,
  (d) means for providing heat interaction between the primary processing zone and the auxiliary processing zone of each processing zone,
  (e) means for introducing a mass of liquid derived from the feed into the primary processing zone,
  (f) means of agitating the liquid in the primary processing zone,
  (g) means for introducing a mass of an auxiliary heat interaction medium, also referred to as auxiliary medium, that undergoes an endothermic transformation into the auxiliary processing zone,
  (h) a first vapor passage for removing a first vapor from each auxiliary processing zone,
  (i) a second vapor passage for introducing a second vapor which is a super-triple point solvent vapor whose pressure is somewhat higher than the triple point pressure of the solvent into each primary processing zone, characterized in that the apparatus is operable in cycles and the operations in each processing zone in each cycle comprises the following steps:
  (1) a first primary step of applying a mass of liquid derived from the feed on a set of solid surfaces, referred to as solidification surfaces, in a primary processing zone and removing heat from the primary processing zone to thereby form a layer of solvent solid from the liquid on each of the set of the solidification surfaces, thereby forming a solid-liquid interface, while agitating the liquid near the solid-liquid interface, and discharging a mass of liquid from the primary zone as the second product;
  (2) a first auxiliary step of subjecting an auxiliary heat interaction medium to a vaporization operation to thereby generate a first vapor in the auxiliary processing zone and establishing a heat interaction relation between the primary processing zone and the auxiliary processing zone to thereby transfer the heat released in the first primary step to supply the heat used in the first auxiliary step;
  (3) a second primary step of separating the liquid from the layer of the solvent solid on each of the solidification surfaces; and
  (4) a third primary step of bringing a stream of the super-triple point solvent vapor in contact with the solvent solid to thereby simultaneously melt the solvent solid and condense the super-triple point solvent vapor and thereby produce a mass of purified solvent liquid, a major fraction of the purified solvent liquid constituting the first product.

34. An apparatus of claim 33, which comprises a set of heat conductive walls separating the primary processing zone and the auxiliary processing zone, the heat released in the first primary step passing through the walls to provide the heat needed in the first auxiliary step.

35. An apparatus of claim 34, wherein each of the heat conductive walls is a substantially vertical wall having a first surface and a second surface, the two sides across the wall and bounded by the two surfaces being respectively denoted as the first-side and the second-side, and during the first primary step, a mass of liquid derived from the feed is applied on the first side of the wall to form a first liquid film and a mass of auxiliary medium is applied on the second side of the wall to form a second liquid film and thereby induce the heat interaction between the two zones and form a layer of solvent solid on the first surface and generate the first vapor in the second side.

36. An apparatus of each of claims 33, 34 or 35, which further comprises:
  (f) a second auxiliary processing zone in each processing zone that is in vapor communication with the first auxiliary processing zone,
  (g) a third auxiliary processing zone in each processing zone that is in vapor communication with the primary processing zone, (h) a set of heat conductive walls separating the second auxiliary processing zone from the third auxiliary processing zone, (i) means of introducing an absorbing solution to the second auxiliary zone, (j) means of applying a mass of solvent liquid to the third auxiliary zone, and is further characterized in that the operations further comprises:

(5) a fifth step of absorbing the first vapor generated in the first auxiliary zones into an absorbing solution at a temperature somewhat higher than the melting temperature of the solvent, and (6) a sixth step of generating a stream of second vapor which becomes the super-triple point vapor used in the third primary step, the heat released in the fifth step being transmitted through the partitioning walls and being used in the sixth step.

37. An apparatus of claim 36, which comprises a set of enclosures made of heat conductive walls into an internal region that is within the enclosures and an external region that is outside of enclosures, the internal region being further divided into a first internal region and a second internal region, the external region being also divided into a first external region and a second external region that are respectively in heat interaction relations with the first internal region and the second internal region through the heat conductive walls, and the process is conducted cyclically and each cycle comprises a first main period, a first transition period, a second main period and a second transition period, the process during the first main period comprises:

(a) Step 1 of conducting a first primary step of forming a mass of solvent solid in the first external region;

(b) Step 2 of conducting a first auxiliary step of vaporizing a mass of the auxiliary medium in the first internal region to thereby generate a stream of first vapor;

(c) Step 3 of subjecting the first vapor to the temperature lifting first vapor absorption in the second internal region;

(d) Step 4 of generating a stream of second vapor which is the super-triple point vapor used in the third primary step in the second external region;

the heat generated in Step 1 being used to supply the heat needed in Step 2, the heat generated in Step 3 being used to supply the heat needed in Step 4, the first vapor being transferred from the first internal region to the second internal region;

the process during the second main period comprises:

(a) Step 1 of conducting a first primary step of forming a mass of solvent solid in the second external region;

(b) Step 2 of conducting a first auxiliary step of vaporizing a mass of the auxiliary medium in the second internal region to thereby generate a stream of first vapor;

(c) Step 3 of subjecting the first vapor to the temperature lifting first vapor absorption in the first internal region;

(d) Step 4 of generating a stream of second vapor which is the super-triple point vapor used in the third primary step in the first external region;

the heat generated in Step 1 being used to supply the heat needed in Step 2, the heat generated in Step 3 being used to supply the heat needed in Step 4, the first vapor being transferred from the second internal region to the first internal region.

38. An apparatus of claim 37, wherein each of the enclosure comprises two heat conductive walls spaced a distance apart, the enclosure having a thickness direction that is perpendicular to the walls, a width direction and a length direction that are perpendicular to each other and are perpendicular to the thickness direction, the interior of each enclosure being divided in the width direction into a first internal region and a second internal region.

39. A process of claim 37, wherein each of the enclosure comprises two heat conductive walls spaced a distance apart, the enclosure having a thickness direction that is perpendicular to the walls, a width direction and a length direction that are perpendicular to each other and are perpendicular to the thickness direction, the interior of each enclosure being divided in the thickness direction into a first internal region and a second internal region.

40. An apparatus of each of claims 33, 34 or 35, which further comprises a refrigeration loop that removes heat from the first vapor to transform the vapor into a condensed mass, upgrade the heat and supply heat to a mass of solvent liquid to generate the super-triple point vapor needed in the third primary step.

41. An apparatus of each of claims 33, 34 or 35, which further comprises:

(a) a compressor that compresses the first vapor of the auxiliary medium to thereby raise its condensation temperature, and (b) a heat exchanger that condenses the compressed auxiliary medium vapor and generate the super-triple point solvent vapor.

42. An apparatus of each of claims 33, 34 or 35, which further comprises:

(a) a heat exchanger containing a second auxiliary medium, and is further characterized in that the apparatus is operable in conducting the following steps:

(1) melting the second auxiliary medium under a first temperature and a first pressure to remove heat from the first vapor to thereby transform the first vapor into a condensed mass, and (2) solidify the second auxiliary medium under a second temperature and a second pressure to supply heat in generating the super-triple point solvent vapor.

43. A process of upgrading heat energy for removing heat from a first substance at a first temperature and supplying heat to a second substance at a second temperature that is higher than the first temperature, wherein the process is conducted in a system that is divided by a set of panel enclosures made of heat conductive walls into an internal region that is within the enclosures and an external region that is outside of enclosures, the internal region being further divided into a first internal region and a second internal region, the external region being also divided into a first external region and a second external region that are respectively in heat interaction relations with the first internal region and the second internal region through the heat conductive walls, each panel enclosure comprising two heat conductive walls spaced a short distance apart, and the process comprises:

(a) Step 1 of introducing a mass of the first substance at the first temperature into the first external region;

(b) Step 2 of vaporizing a mass of a first auxiliary medium in the first internal region to thereby generate a stream of first vapor and remove heat from the first substance in the first external region through the heat conducting walls;

(c) Step 3 of introducing a mass of the second substance at the second temperature into the second external region;

(d) Step 4 of absorbing the first vapor into an absorbing solution of such a composition that the absorbing temperature is higher than the second temperature and transmitting the heat of absorption through the heat conducting walls to the second substance in the second external region.

44. A process of claim 43, wherein the enclosure having a thickness direction that is perpendicular to the walls, a width direction and a length direction that are perpendicular to each other and are perpendicular to the thickness direction, the interior of each enclosure being divided in the width direction into a first internal region and a second internal region.

45. A process of claim 43, wherein the enclosure having a thickness direction that is perpendicular to the walls, a width direction and a length direction that are perpendicular to each other and are perpendicular to the thickness direction, the interior of each enclosure being divided in the thickness direction into a first internal region and a second internal region.

46. A process of claim 43, wherein the first substance enters as a vapor and is discharged as a liquid mass.

47. A process of claim 43, wherein the first substance is subjected to a condensation operation under a first pressure and the second substance is subjected to a vaporization operation under a second pressure.

48. A process of claim 46, wherein the first substance and the second substance are the same substance and the second pressure is substantially higher than the first pressure.

49. A process of claim 43, wherein the first substance enters as a liquid mass and is chilled.

50. A process of claim 43, wherein the first substance enters as a gas and is thereby chilled.

51. An apparatus for upgrading heat energy by removing heat from a first substance at a first temperature and supplying heat to a second substance at a second temperature that is higher than the first temperature that comprises:

(a) an outer enclosure, (b) a set of panel enclosures each made of two heat conductive walls spaced a short distance apart, (c) an internal region that is enclosed within the panel enclosures, (d) an external region that is outside of the enclosures, the internal region being further divided into a first internal region and a second internal region, the external region being also divided into a first external region and a second external region that are respectively in heat interaction relations with the first internal region and the second internal region through the heat conductive walls and is characterized in that the apparatus can be operated to conduct the following steps:

(a) Step 1 of introducing a mass of the first substance at the first temperature into the first external region, (b) Step 2 of vaporizing a mass of a first auxiliary medium in the first internal region to thereby generate a stream of first vapor and remove heat from the first substance in the first external region through the heat conducting walls, (c) Step 3 of introducing a mass of the second substance at the second temperature into the second external region, (d) Step 4 of absorbing the first vapor into an absorbing solution of such a composition that the absorbing temperature be higher than the second temperature and transmitting the heat of absorption through the heat conducting walls to the second substance in the second external region.

52. An apparatus of claim 51, wherein the enclosure having a thickness direction that is perpendicular to the walls, a width direction and a length direction that are perpendicular to each other and are perpendicular to the,thickness direction, the interior of each enclosure being divided in the width direction into a first internal region and a second internal region.

53. A process of claim 51, wherein the enclosure having a thickness direction that is perpendicular to the walls, a width direction and a length direction that are perpendicular to each other and are perpendicular to the thickness direction, the interior of each enclosure being divided in the thickness direction into a first internal region and a second internal region.

54. An apparatus of claim 53, wherein the first substance and the second substance are the same substance and the second pressure is substantially higher than the first pressure.

55. An apparatus of claim 51, wherein the first substance is subjected to a condensation operation under a first pressure and the second substance is subjected to a vaporization operation under a second pressure.

56. An apparatus of claim 51, wherein the first substance enters as a vapor and is discharged as a liquid mass.

57. An apparatus of claim 51, wherein the first substance enters as a liquid mass and is thereby chilled.

58. An apparatus of claim 51, wherein the first substance enters as a gas and is thereby chilled.

* * * * *